(12) United States Patent
Roy et al.

(10) Patent No.: US 12,245,597 B2
(45) Date of Patent: Mar. 11, 2025

(54) COMPOSITIONS AND METHODS FOR INHIBITING PLANT PATHOGENS

(71) Applicant: Ocean Spray Cranberries, Inc., Lakeville-Middleboro, MA (US)

(72) Inventors: Soumya Roy, Lakeville-Middleboro, MA (US); Chester A. Baker, Lakeville-Middleboro, MA (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 0 days.

(21) Appl. No.: 15/998,788

(22) Filed: Aug. 15, 2018

(65) Prior Publication Data
US 2019/0059392 A1   Feb. 28, 2019

Related U.S. Application Data

(60) Provisional application No. 62/545,955, filed on Aug. 15, 2017.

(51) Int. Cl.
| | |
|---|---|
| *A01N 65/16* | (2009.01) |
| *A01N 25/30* | (2006.01) |
| *A01N 37/08* | (2006.01) |
| *A01N 43/16* | (2006.01) |
| *A01N 63/50* | (2020.01) |
| *A01N 65/00* | (2009.01) |

(52) U.S. Cl.
CPC ............. *A01N 65/16* (2013.01); *A01N 25/30* (2013.01); *A01N 37/08* (2013.01); *A01N 43/16* (2013.01); *A01N 63/50* (2020.01); *A01N 65/00* (2013.01); *C12Y 301/0102* (2013.01); *C12Y 302/01* (2013.01); *C12Y 302/01001* (2013.01)

(58) Field of Classification Search
CPC ........ A01N 65/16; A01N 63/50; A01N 65/00; A01N 37/08; A01N 43/16; A01N 25/30; C12Y 302/01001; C12Y 302/01; C12Y 301/0102
See application file for complete search history.

(56) References Cited

U.S. PATENT DOCUMENTS

| | | | | |
|---|---|---|---|---|
| 3,502,485 A | * | 3/1970 | Charles | B65B 25/02 422/294 |
| 2006/0276541 A1 | * | 12/2006 | Tautvydas | A23L 3/3517 514/553 |
| 2008/0254135 A1 | * | 10/2008 | Heuer | A61P 3/10 424/523 |
| 2009/0175843 A1 | * | 7/2009 | Gans | A61K 31/375 424/94.65 |
| 2011/0124502 A1 | * | 5/2011 | Enan | A01N 61/00 504/118 |
| 2011/0239327 A1 | * | 9/2011 | Curtis | C12N 15/8285 800/279 |
| 2012/0076904 A1 | * | 3/2012 | Sinha | A23L 2/74 426/431 |
| 2015/0126598 A1 | * | 5/2015 | Sanoner | A61K 31/353 514/456 |
| 2016/0174554 A1 | * | 6/2016 | Telge Noriega | A01N 37/40 514/533 |
| 2017/0006863 A1 | | 1/2017 | Gabriel et al. | |
| 2017/0181458 A1 | | 6/2017 | Mantius et al. | |
| 2017/0251668 A1 | * | 9/2017 | Baltruschat | A01N 31/16 |
| 2018/0220680 A1 | | 8/2018 | Roy et al. | |

FOREIGN PATENT DOCUMENTS

| | | | | |
|---|---|---|---|---|
| TW | 187640 | | 7/1992 | |
| WO | WO-2016034165 A1 | * | 3/2016 | ............. A01N 43/16 |
| WO | WO-2016089898 A1 | * | 6/2016 | ............. A01N 31/08 |
| WO | WO 2019035926 | | 2/2019 | |

OTHER PUBLICATIONS

Tadych, Mariusz, et al. "Interactions between cranberries and fungi: the proposed function of organic acids in virulence suppression of fruit rot fungi." Frontiers in microbiology 6 (2015): 835.*
Borowska, Eulalia J., et al. "Polyphenol, anthocyanin and resveratrol mass fractions and antioxidant properties of cranberry cultivars." Food Technology and Biotechnology 47.1 (2009): 56-61.*
Martins, Isabela M., et al. "Enzymatic biotransformation of polyphenolics increases antioxidant activity of red and white grape pomace." Food Research International 89 (2016): 533-539.*
Technology for Agriculture- BREAK-THRU & SURFYNOL spreaders and penetrants webpage [online], downloaded from the internet on (Aug. 14, 2020) from URL <https://www.break-thru.com/product/break-thru/en/products/spreaders-penetrants/>.*
R. Sitaraman, "*Pseudomonas* spp. as models for plant-microbe interactions," Frontiers in Plant Science, Opinions, Sep. 2015 , vol. 6, Article 787, pp. 1-4.*
O. Schreiner et al., "The Toxic Action of Certain Organic Plant Constituents," Botanical Gazette, vol. 45, No. 2 (Feb. 1908), pp. 73-102.*
Z. Zhang et al., "Effects of Phenolic Acids on Mitochondria and the Activity of Antioxidant Enzymes in Roots of Seedlings of Malus hupehensis Rehd," Scientia Agricultura Sinica, 2011, 44(15): 3177-3184.*
"Quercetin", Publication Date: Jul. 12, 2017; Retrieval Date: Oct. 17, 2018; 11, 32, 60-61 https://en.wikipedia.org/w/index.php?title=Quercetin&oldid=790163961 ; pp. 1-7 p. 1, Para [1); p. 2, Table of Foods containing quercetin.
International Search Report and Written Opinion in International Application No. PCT/US18/00195, dated Nov. 15, 2018, 13 pages.
Khuwijitjaru et al., "Subcritical water extraction of flavoring and phenolic compounds from cinnamon bark (Cinnamomum zeylanicum)", J. Oleo Sci 61(6):349-355, 2012.

(Continued)

*Primary Examiner* — Monica A Shin
(74) *Attorney, Agent, or Firm* — Fish & Richardson P.C.

(57) ABSTRACT

The present specification provides, in one aspect, a method of treating or inhibiting infection of a plant by a plant pathogen. The method includes contacting the plant with an amount of a cranberry composition effective to inhibit the plant pathogen. In another aspect, the present specification provides a composition for treatment of a plant disease. The composition includes a cranberry composition and a carrier that delivers the cranberry composition to at least a portion of a phloem of a citrus plant.

38 Claims, 9 Drawing Sheets

(56) References Cited

OTHER PUBLICATIONS

Sanzani et al., "Effectiveness of Phenolic Compounds against Citrus Green Mould", Molecules 19:12500-12508, Aug. 18, 2014.
Talebi et al., "Foliar sprays of citric acid and malic acid modify growth, flowering, and root to shoot ratio of Gazania (*Gazania rigens* L.): A Comparative analysis by ANOVA and structural equations modeling," Hindawi Publishing Corporation, 2014: 1-6, Oct. 28, 2014.
Cunningham et al., "Quality Management of Nutraceuticals," ACS Symposium series 803, American Chemical Society, Washington DC, Jan. 2002, 21 pages.
De Pascual-Teresa et al., "Analysis of flavanols in beverages by high-performance liquid chromatography with chemical reaction detection," J. Agric. Food Chem., 1998, 46:4209-4213.
Martin et al., "Chemical Characterization and Chemo-Protective Activity of Cranberry Phenolic Powders in a Model Cell Culture. Response of the Antioxidant Defenses and Regulation of Signaling Pathways," Food Res. Int., 2015. 71:68-82.
MX Office Action in Mexican Appln. No. MX/a/2020/001769, dated Jul. 13, 2020, 5 pages (with English translation).
PCT International Preliminary Report on Patentability in International Application No. PCT/US2018/00195, dated Feb. 18, 2020, 11 pages.
Prior et al., "Multi-laboratory validation of a standard method for quantifying proanthocyanidins in cranberry powders," J. Sci. Food Agric., 2010, 90:1473-1478.
Singleton et al., "Colorimetry of total phenolics with phosphomolybdic-phosphotungstic acid reagents." American Journal of Enology and Viticulture, Jan. 1, 1965, 16(3): 144-58.
BR Office Action in Brazilian Appln. No. BR112020003023-6, dated Jun. 15, 2022, 5 pages (with English translation).
MX Office Action in Mexican Appln. No. MX/a/2020/001769, dated Mar. 13, 2023, 22 pages (with English translation).
MX Office Action in Mexican Appln. No. MX/a/2020/001769, dated, Sep. 6, 2022, 21 pages (with English translation).
Neto, "Cranberry and its phytochemicals: a review of in vitro anticancer studies," The Journal of Nutrition, Jan. 1, 2007, 137(1):186S, 19 pages.

\* cited by examiner

COMPOSITIONS AND METHODS FOR INHIBITING PLANT PATHOGENS

CLAIM OF PRIORITY

This application claims the benefit of U.S. Patent Application Ser. No. 62/545,955, filed on Aug. 15, 2017. The entire contents of the foregoing are hereby incorporated by reference.

TECHNICAL FIELD

The present disclosure generally relates to compositions and treatments for plant diseases.

BACKGROUND

Huanglongbing (HLB), also known as citrus greening, yellow shoot, or yellow dragon, is a bacterial disease affecting citrus plants. In Florida, HLB is a major contributor to the decline in orange production between 2003 and 2016 as traditional pest and plant disease management systems have not been adequate in treating HLB.

SUMMARY

The present disclosure is based, in part, on the discovery of new methods for treating HLB, among other plant diseases. The treatments involve administering to plants, e.g., citrus plants, compositions that are rich in polyphenols (such as proanthocyanidins (PACs)), benzoic acid, quinic acid, and/or xyloglucans, such as cranberry compositions. The compositions may be administered to plants, e.g., citrus plants, in any number of ways, e.g., injected into an affected plant, sprayed onto an affected plant, implanted into an affected plant, injected into the soil around an affected plant, and/or sprayed onto the soil surrounding an affected plant. The compositions may be combined with a carrier for improved delivery of the compositions into the phloem of the plant, where HLB bacteria reside. The compositions may offer the advantage of being easily incorporated into an integrated pest management system already in use in citrus agriculture. The compositions may offer the advantage that they are naturally-derived and therefore may be used in producing organic plant products.

Accordingly, in one aspect, the present specification presents a composition for treatment of a plant disease including phenolics at 1 mg/g to 100 mg/g and an adjuvant that enables the composition to be delivered to at least a portion of a phloem of a citrus plant.

In some implementations, the composition includes quinic acid at 0.01% to 14%. In some instances, the composition includes quinic acid at about 0.1% to about 4%.

In some implementations, the composition includes at least one of malic acid and citric acid at 0.01% to 20%. In some instances, the composition includes citric acid at about 0.1% to about 4%. In some instances, the composition includes malic acid at about 0.1% to about 3%.

In some implementations, the composition includes proanthocyanidins at 1,000 mg/kg to 100,000 mg/kg. In some instances, the composition includes proanthocyanidins at about 2,000 mg/kg to about 5,000 mg/kg. In some instances, the composition includes proanthocyanidins at about 30,000 mg/kg to about 60,000 mg/kg.

In some implementations, the composition includes at least one of a countercurrent extraction concentrate, a co-current extraction concentrate, a mash concentrate, an ultra-filtration retentate, a resin extract, and a subcritical water extractions of leaves, of presscake, or of fruit.

In some implementations, the composition is derived from cranberries.

In some implementations, the composition is derived from one or more of cranberries, blueberries, elderberries, chokeberries, lingonberries, raspberries, grapes, gooseberries, huckleberries, strawberries, blackberries, cloudberries, blackcurrants, redcurrants, white currants, and cinnamon bark, or any combination thereof.

In some implementations, the adjuvant includes a surfactant.

In some implementations, the composition includes a starch degrading enzyme, wherein the adjuvant is configured to deliver the starch degrading enzyme to at least a portion of the phloem of the plant. In some instances, the starch degrading enzyme is an amylase.

In some implementations, the adjuvant includes at least one of a mineral oil, a horticultural oil, a vegetable oil, and a seed oil.

In some implementations, the adjuvant includes a tannase enzyme.

In some implementations, the composition includes at least one antibiotic.

In some implementations, the composition includes at least one of β-aminobutyric acid, 2-Deoxy-D-glucose, salicyclic acid, oxalic acid, trehalose, trehalose-6-phosphate, or any combination thereof.

In some implementations, the composition includes at least one insecticide.

In some implementations, the composition includes a cranberry solids content of about 1 Brix.

In some implementations, the composition includes a cranberry solids content of about 10 Brix.

In some implementations, the composition includes a cranberry solids content of about 20 Brix.

In some implementations, the composition includes anthocyanins at about 1 mg/kg to about 100 mg/kg.

In some implementations, the composition includes anthocyanins at about 2,000 mg/kg to about 5,000 mg/kg.

In some implementations, the composition includes total phenolics at about 3 mg/g to about 12 mg/g.

In some implementations, the composition includes total phenolics at about 35 to about 65 mg/g.

In some implementations, the composition includes a buffer.

In another aspect, the present specification provides a method of treating or inhibiting infection of a plant by a plant pathogen, including contacting the plant with an amount of a composition effective to inhibit the plant pathogen, wherein the composition includes phenolics at 1 mg/g to 100 mg/g.

In some implementations, contacting the plant includes brushing or spraying onto the plant, or injecting into the plant, the composition.

In some implementations, contacting the plant includes spraying, drenching, mixing, or injecting the composition into soil surrounding the plant.

In some implementations, the composition is derived from cranberries.

In some implementations, the composition is derived from one or more of cranberries, blueberries, elderberries, chokeberries, lingonberries, raspberries, grapes, gooseberries, huckleberries, strawberries, blackberries, cloudberries, blackcurrants, redcurrants, white currants, and cinnamon bark, or any combination thereof.

In some implementations, the composition includes a carrier that enables delivery of the composition to a phloem of the plant.

In some implementations, the carrier includes at least one of a mineral oil, a horticultural oil, a vegetable oil, and a seed oil.

In some implementations, the composition includes a starch degrading enzyme. In some instances, the starch degrading enzyme is an amylase.

In some implementations, the composition includes a tannase enzyme.

In some implementations, the composition includes at least one antibiotic.

In some implementations, the plant is a citrus plant and the plant pathogen is *Candidatus Liberibacter.*

In some implementations, the composition includes a cranberry solids content of about 1 Brix.

In some implementations, the composition includes a cranberry solids content of about 10 Brix.

In some implementations, the composition includes a cranberry solids content of about 20 Brix.

In some implementations, the composition includes at least one of citric and malic acid at 0.01% to 20%. In some instances, the composition includes citric acid at about 0.1% to about 4%. In some instances, the composition includes malic acid at about 0.1% to about 3%.

In some implementations, the composition includes quinic acid at about 0.01% to about 14%. In some instances, the composition includes quinic acid at about 0.1% to about 4%.

In some implementations, the composition includes anthocyanins at about 1 mg/kg to about 100 mg/kg.

In some implementations, the composition includes anthocyanins at about 2,000 mg/kg to about 5,000 mg/kg.

In some implementations, the composition includes comprises proanthocyanidins at about 1,000 mg/kg to about 100,000 mg/kg. In some instances, the composition includes proanthocyanidins at about 2,000 mg/kg to about 5,000 mg/kg. In some instances, the composition includes proanthocyanidins at about 30,000 mg/kg to about 60,000 mg/kg.

In some instances, the composition includes total phenolics at about 3 mg/g to about 12 mg/g. In some instances, the composition comprises total phenolics at about 35 to about 65 mg/g.

In another aspect, the present specification provides a composition for treatment of a plant disease including phenolics at 1 mg/g to 100 mg/g, wherein the composition is in the form of a fertilizer spike, a solid fertilizer mix, a liquid fertilizer mix, a soil drench, a soil comprising the composition, a spray, a gel, an injectable composition, or an implantable composition.

In some implementations, the composition includes at least one of malic acid and citric acid at 0.01% to 20%.

In some implementations, the composition includes quinic acid at 0.01% to 14%.

In some implementations, the composition includes proanthocyanidins at 1,000 mg/kg to 100,000 mg/kg.

In some implementations, the composition is derived from cranberries.

In another aspect, the present specification provides a cranberry composition for treatment of a plant disease that includes phenolics at 1 mg/g to 100 mg/g, quinic acid at 0.5% to 2%, and proanthocyanidins at greater than 20,000 mg/kg.

In another aspect, the present specification provides a cranberry composition for treatment of a plant disease that includes phenolics at 1 mg/g to 100 mg/g and proanthocyanidins at greater than 20,000 mg/kg.

In another aspect, the present specification provides a cranberry composition for treatment of a plant disease that includes phenolics at 1 mg/g to 100 mg/g, optionally includes quinic acid at 0.5% to 2%, and optionally includes proanthocyanidins at greater than 20,000 mg/kg.

In another aspect, the present specification provides a cranberry composition for treatment of a plant disease that includes phenolics at 1 mg/g to 100 mg/g, total organic acids (citric acid, malic acid, and quinic acid) at 0.5% to 6%, and proanthocyanidins at greater than 20,000 mg/kg.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

Figure 1:
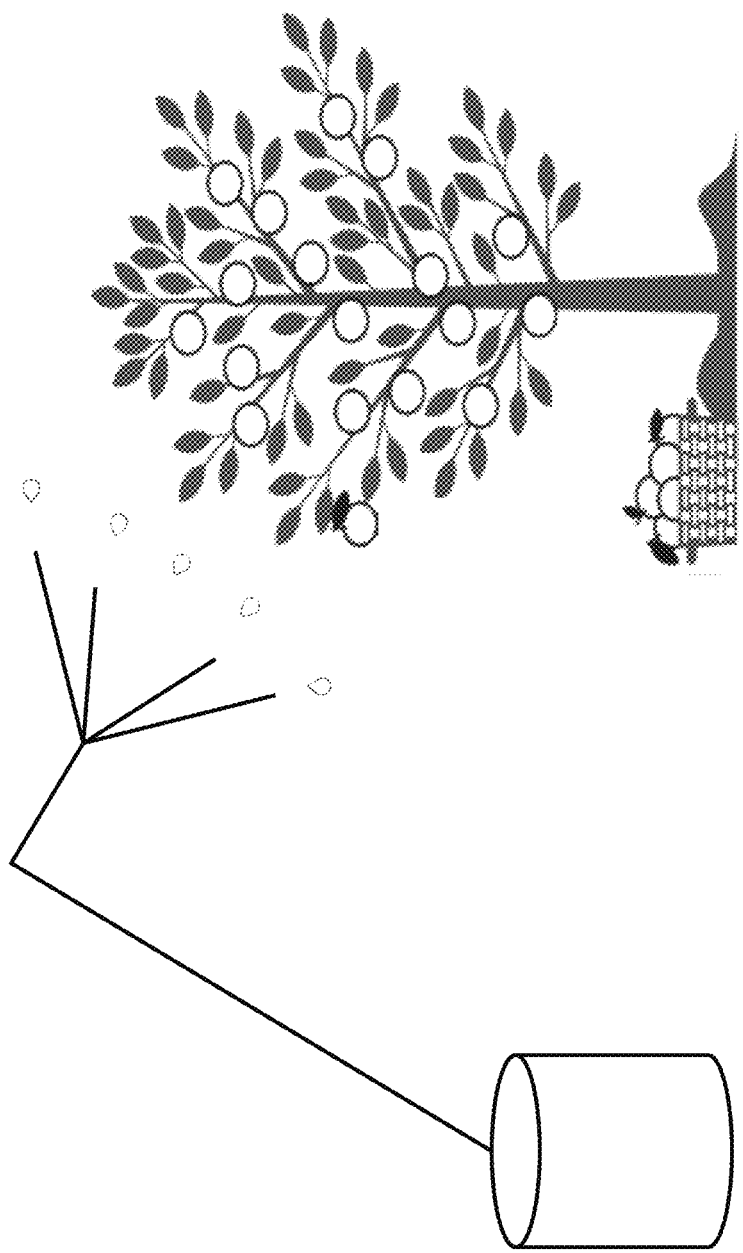
FIG. 1 is a schematic of a system for treating plants affected with HLB with cranberry compositions.

FIG. 4 is a bar graph showing a minimum inhibitory concentration of three cranberry compositions in vitro against *L. crescens.*

FIG. 5 is a bar graph showing a number of copies of *CLas* present over time in leaves treated with cranberry compositions as determined by qPCR.

FIG. 6 is a bar graph showing a change in PMA titer over time in leaves treated with cranberry compositions.

FIGS. 7A and 7B are photographs of leaves sprayed with cranberry compositions immediately after application and after 48 hours, respectively.

FIGS. 8A and 8B are photographs of citrus leaves dipped in control buffer solution at the time of initial treatment and after seven days, respectively.

FIGS. 9A and 9B are photographs of citrus leaves dipped in SWE of Presscake cranberry extract at the time of initial treatment and after seven days, respectively.

DETAILED DESCRIPTION

This disclosure describes, e.g., methods for treating and preventing the spread of plant pathogens, such as the bacterial pathogen that causes HLB. Traditional methods of treating plant diseases or pests, including insecticides and antibiotics, often do not work well in treating HLB as the HLB bacteria α-proteobacterium *Candidatus Liberibacter* spp. (also known as *CLas* or *Las*) reside in the phloem of the infected plant. Pairing a composition described herein, such as a cranberry composition, with a suitable carrier for delivery into the phloem provides improved treatment for HLB. The composition and carrier may be delivered to the plants via a variety of methods, such as by administering sprays, liquids, aerosols, solid compositions, and/or injectables, among others. In some instances, a composition described herein may not require a carrier to provide treatment for HLB.

Generally, the methods include administering an effective amount of a composition described herein to a plant in need of, or which has been determined to be in need of, such treatment. As used in this context, to "treat" means to ameliorate at least one symptom of a plant disease, such as HLB and/or to reduce the number, viability, and/or growth rate of a plant pathogen, e.g., *CLas*, in the plant. For example, in some instances of treating HLB, treatment can result in reduced yellowing in one or more parts of the plant, e.g., in the leaves, as compared to untreated plants infected with *CLas*. In other instances, treatment can result in greater fruit production (e.g., measurable as the number and/or size of the fruit) as compared to untreated plants infected with *CLas*. In still other instances, treatment with a composition described herein can result in a reduced rate of onset of the disease symptoms as compared to untreated plants. In yet other instances for treating HLB, treatment can result in the reduction of lower Brix and higher acidity that is typically associated with citrus greening. In still other instances, treatment can result in the increase of the Ct values (a measure of *CLas* titer) when using qPCR to analyze a sample obtained from an infected plant.

An "effective amount" is an amount sufficient to effect beneficial or desired results. For example, a therapeutic amount is one that achieves the desired therapeutic effect. This amount can be the same or different from a prophylactically effective amount, which is an amount necessary to prevent onset of disease or disease symptoms. An effective amount can be administered in one or more administrations, applications or dosages. The compositions can be administered on from one or more times per day to one or more times per week; including once every other day, once per month, or once per year. The skilled artisan will appreciate that certain factors may influence the amount and timing required to effectively treat a plant, including but not limited to the severity of the disease, previous treatments, the general health, age, and/or type of the plant, and the presence of other plant diseases.

In one example, in cranberry, compositions, the concentration of cranberry solids in the composition can be approximately between 1 and 65 Brix, for example about 1 Brix to about 2 Brix, about 2 Brix to about 4 Brix, about 4 Brix to about 10 Brix, about 10 Brix to about 20 Brix, about 20 to about 30 Brix, about 30 to about 40 Brix, about 40 to about 50 Brix, about 50 to about 60 Brix, about 60 to about 65 Brix, or about 1 Brix, 2 Brix, 4 Brix, 10 Brix, 20 Brix, 30 Brix, 40 Brix, 50 Brix, 60 Brix, or 65 Brix.

Depending on the treatment method used, varying amounts of the cranberry composition can be applied to the plant. For example, in a foliar application (applying liquid to the leaves of a plant) between about 20 and about 500 gallons of cranberry composition could be applied per acre where an acre can include approximately 80 to 130 trees for older groves and approximately 140 to 220 trees for new groves. The amount may be lower when less than 80 trees are present per acre. In another example, in a trunk injection, between about 10 ml and about 3 L could be injected per 100 inches of trunk diameter. In another example, when using a soil drenching application method about 1 to about 500 gallons could be applied per acre where an acre includes approximately 80 to 130 trees. The amount may be lower when less than 80 trees are present per acre. Treatments may be performed as often as deemed necessary by the skilled practitioner, e.g., between 1 and about 16 times per year, e.g., 1, 2, 3, 4, etc. times per year.

Plants treatable with compositions described herein, e.g., cranberry compositions, include, but are not limited to, citrus plants, e.g., orange trees, mandarin trees, grapefruit trees, lemon trees, and their hybrids. Plant pathogens that may be treated with compositions described herein, e.g., cranberry compositions, include bacteria, viruses, fungi, and nematodes, among others. These plant pathogens may attack any tissue of the plant, including leaves and roots.

Disease Description

HLB commonly causes yellowing of infected plants' veins and tissue, mottling of leaves, defoliation, root decay, and ultimately plant death. Affected plants may also have stunted growth and may produce small, irregularly shaped fruit with partially green peels. HLB is a bacterial disease spread by psyllid insects (also known as jumping plant lice). The HLB bacteria, a phloem-limited fastidious prokaryotic α-proteobacterium *Candidatus Liberibacter* spp. (*CLas* or often termed *Las*), most notably *Ca. L. asiaticus, Ca. L. africanus*, and *Ca. L. americanus. Ca. L. asiaticus*, and its vector *Diaphorina citri*, also known as Asian Citrus Psyllid (ACP) are the major cause of HLB disease in North America. The psyllids ingest the HLB bacteria while consuming plant tissue from a plant infected with HLB and transmit the HLB bacteria to uninfected plants in the process of ingesting tissue of the uninfected plant. In an infected plant, the HLB bacteria resides in the phloem of the plant. Phloem is the vascular tissue in plants that conducts sugars and other metabolic products downward from the leaves. The HLB bacteria metabolizes the sugar that would otherwise be transported through the phloem to other parts of the plant, leading to stunted growth and yellowing of plant parts. Additionally, *CLas* creates starchy materials within phloem that further reduces the ability of anti-bacterial agents to reach the *CLas* themselves.

Skilled practitioners will appreciate that other plant diseases from phloem-restricted bacteria, such as Liberibacters other than *CLas*, namely *Candidatus Liberibacter solanaceous* known to cause diseases in potatoes and carrots and Phlomobacters, such as *Candidatus Phlomobacter fragariae* identified to cause Marginal Chlorosis of strawberries, could be treated with compositions and methods described herein as well. In addition to the above proteobacteria, wall-less bacteria, also known as mollicutes, such as phytoplasmas and spiroplasmas could also be treated with compositions and methods described herein. Exemplary plant diseases caused by phytoplasmas include, e.g., Lethal Yellowing of palm and Peach diseases, such as Peach Rosette, Little Peach, Peach Yellows, and Red Sutures. Exemplary plant diseases caused by spiroplasmas include, e.g., Citrus Stubborn Disease (caused by *Spiroplasma citri*) and Corn Stunt Disease (caused by *Spiroplasma kunkelii*).

Skilled practitioners will appreciate that other plant diseases, such as those that reside in the xylem, often progress to the phloem and could also be treated with compositions and methods described herein. For example, Pierce's Disease (caused by *Xyllella fastidiosa*) and Tomato Cankers (caused by *cornebacterium michiganense*) may be treatable with cranberry compositions. Because delivery to a plant's xylem rather than a plant's phloem is generally easier, concentrations of cranberry solids in the composition applied to the plant may be less than for treatment of a phloem-based disease.

In addition, fungal diseases, such as Soybean Rust (caused by *Phakopsora pachyrhizi*), Laurel Wilt of woody plants (*Raffaelea lauricola*), and Sudden Oak Death (caused by *Phytophthora ramorum*) and viruses such as Maize Stripe (caused by tenuivirus) could also be treated with cranberry compositions.

Cranberry Compositions for Disease Inhibition

Compositions rich in polyphenols, such as proanthocyanidins, or benzoic acid or quinic acid or xyloglucans or a combination thereof, are effective against plant pathogens, such as *CLas*. Particularly useful in the presently described methods are cranberry compositions. A cranberry composition is a composition comprising a component of, or a component derived from, a cranberry plant, such as a cranberry, that displays at least one antibacterial property (e.g., a bactericidal or bacteriostatic property). The cranberry composition's activity against *CLas* may include, e.g., action as an antimicrobial agent, a disruptor of biofilms and/or quorum sensing mechanisms, or as an anti-adhesion agent to disrupt the microbiome.

Various cranberry compositions may have differing levels of acids (e.g., citric, malic, and quinic acids) and phenolics, including anthocyanins and PACs. Phenolics include polyphenols and phenolic acids. Within polyphenols, there are flavonoids and other polyphenols, such as resveratrol. Flavonoids may be Flavans or Polyflavanols, such as Proanthocyanidins (PACs). Flavans may be Anthocyanins, or Flavonols or Flavanols. Cranberry compositions suitable for treatment of plant diseases, such as HLB, may be produced via known cranberry processing methods. For example, cranberry compositions may include those derived from a subcritical water extraction (SWE) of cranberry presscake, leaves, and/or fruit. In another example, cranberry compositions may include a concentrate from a countercurrent extraction (CCE) process. A number of examples of cranberry compositions useful in the presently described methods are listed below in Table 1.

PACs, and about 4-5 mg/g total phenolics. An exemplary CCE concentrate derived from cranberries is shown in Table 1, above.

Mash concentrate may be created by breaking the cranberry fruit using a hammer mill, digesting the pectin using pectinase and decanting or pressing the digested material. A mash extract may then be concentrated via ultrafiltration and evaporation. An exemplary mash concentrate may be about 20-25 Brix solids content, about 2-3% citric acid, about 2-3% malic acid, about 2-4% quinic acid, and may contain about 40-60 mg/kg anthocyanins, about 4,000-5,000 mg/kg PACs, and about 7-8 mg/g total phenolics. An exemplary mash concentrate derived from cranberries is shown in Table 1, above. Resin extract may be created through an anion exchange chromatography process to remove acids from a cranberry juice stream. A method for making resin extract may include adsorbing organic acids (e.g., citric, malic, and quinic acids) onto a single anion exchange resin or series of resins and eluting each type of acid from the aqueous mixture separately. In one example, citric acid and malic acid are bound by a first resin and quinic acid is bound by a second resin. In some implementations, an anion exchange may take place outside of a column, for example in a batch adsorption process. An exemplary resin extract may be about 18-20 Brix solids content, about 0-1% citric acid, about 0-1% malic acid, about 0-1% quinic acid, and may contain about 4,000-5,000 mg/kg anthocyanins, about 50,000-70,000 mg/kg PACs, and about 50-70 mg/g total phenolics. An exemplary resin extract derived from cranberries is shown in Table 1, above.

Resin extract may be mixed with a tannase enzyme. The tannase enzyme aids in hydrolyzing PACs present in the resin extract to smaller molecular weights. Approximately 0.5% of tannase enzyme (Sumizyme TAN) is mixed with

TABLE 1

Cranberry Extract Properties.

| Type of Extract | Brix | Citric % | Malic % | Quinic % | Anthocyanins (mg/kg) | PACs (mg/kg) | Total Phenolics (mg/g) |
|---|---|---|---|---|---|---|---|
| CCE Conc. | 22.11 | 3.23 | 2.39 | 3.27 | 76.15 | 2151.4 | 4.48 |
| Mash Conc. | 20.99 | 2.84 | 2.10 | 3.02 | 49.55 | 4742.9 | 7.4 |
| Resin Extract | 18.49 | 0.27 | 0.15 | 0.20 | 4248.64 | 59831.7 | 61.96 |
| Resin Extract and Tannase | 18.28 | 0.27 | 0.15 | 0.20 | 3968.54 | 50584.96 | 76.38 |
| UF retentate | 22.05 | 2.61 | 1.44 | 2.07 | 2419.4 | 40443.6 | 14.99 |
| SWE of Presscake | 20.00 | 0.13 | 0.08 | 0.08 | 10.69 | 45056.8 | 40.96 |
| SWE of Leaves | 17.37 | 0.24 | 0.25 | 0.87 | 1.9 | 30871.2 | 5.02 |
| SWE of Fruit (Full Acid) | 19.24 | 2.71 | 1.76 | 2.74 | 4.05 | 2269.4 | 8.05 |
| SWE of Fruit (Partial Acid) | 18.74 | 2.41 | 1.55 | 2.59 | 10.56 | 4335.9 | 10.72 |

CCE concentrate is a concentrate created by a countercurrent extraction process. CCE concentrate may be created by extracting cranberry juice from frozen thawed fruit, that has first been sliced or scarified, using water running in a counter current extractor. An extract produced during countercurrent extraction may then be concentrated via ultrafiltration and evaporation. Details of an exemplary countercurrent extraction process can be found in U.S. Pat. No. 5,419,251. An exemplary CCE concentrate may be about 20-25 Brix solids content, about 2-4% citric acid, about 2-3% malic acid, about 3-4% quinic acid, and may contain about 70-80 mg/kg anthocyanins, about 2,000-2,500 mg/kg resin extract to form a solution. An exemplary resin extract and tannase mixture may be about 16-20 Brix solids content about 0-1% citric acid, about 0-1% malic acid, about 0-1% quinic acid, and may contain about 4,000-5,000 mg/kg anthocyanins, about 40,000-60,000 mg/kg PACs, and about 70-80 mg/g total phenolics. An exemplary resin extract derived from cranberries is shown in Table 1, above.

Ultrafiltration (UF) retentate is a solution that includes suspended solids and solutes of high molecular weight, including proanthocyanidins, and may be created by ultrafiltration of CCE concentrate. In some examples, UF retentate may be produced by filtering CCE concentrate through an ultrafiltration membrane system with a molecular weight cutoff of between 2,000 and 10,000 Dalton. An exemplary UF retentate may be about 20-25 Brix solids content, about 2-3% citric acid, about 1-2% malic acid, about 1-3% quinic acid, and may contain about 2,000-3,000 mg/kg anthocyanins, about 30,000-50,000 mg/kg PACs, and about 12-16 mg/g total phenolics. An exemplary UF retentate derived from cranberries is shown in Table 1, above.

Subcritical water extractions (SWE) of presscake, leaves, and fruit may also be used. SWE extractions may be created by treating presscake, leaves, or fruit at about 160° C. and about 2000 psi pressure. An exemplary SWE concentrate made from presscake may be about 18-22 Brix solids content, about 0-1% citric acid, about 0-1% malic acid, about 0-1% quinic acid, and may contain about 5-15 mg/kg anthocyanins, about 40,000-50,000 mg/kg PACs, and about 35-45 mg/g total phenolics. An exemplary SWE concentrate made from leaves may be about 16-20 Brix solids content, about 0-1% citric acid, about 0-1% malic acid, about 0-1% quinic acid, and may contain about 1-3 mg/kg anthocyanins, about 25,000-35,000 mg/kg PACs, and about 4-6 mg/g total phenolics. An exemplary SWE concentrate made from high acid fruit may be about 18-22 Brix solids content, about 2-4% citric acid, about 1-3% malic acid, about 2-4% quinic acid, and may contain about 3-5 mg/kg anthocyanins, about 1,000-3,000 mg/kg PACs, and about 7-9 mg/g total phenolics. An exemplary SWE concentrate made from low acid fruit may be about 16-20 Brix solids content, about 2-3% citric acid, about 1-3% malic acid, about 2-4% quinic acid, and may contain about 5-15 mg/kg anthocyanins, about 4,000-5,000 mg/kg PACs, and about 8-12 mg/g total phenolics. Exemplary SWE extractions derived from cranberries is shown in Table 1, above. Details of an exemplary process for making SWE extractions can be found in U.S. Patent Application Publication No. 2018/0220680.

Co-current concentrate is a concentrate created by a co-current extraction process. Co-current concentrate may be created by extracting juice from fruit in a co-current extractor, for example a DTS system (designed by Dutch TecSource). Skilled practitioners will appreciate that a co-current concentrate may include similar ratios of phenolics, organic acids, and PACs as the example CCE concentrate discussed above.

Skilled practitioners will appreciate that the above-described methods and others can be modified and/or combined as required to produce a composition described herein, and resulting compositions can be adjusted, e.g., diluted, concentrated, selectively enriched, etc., as is suitable for particular treatments.

In some examples, a composition for treating plant diseases as described herein includes a Brix content of about 1 to 65 Brix, for example about 1 Brix to about 2 Brix, about 1 Brix to about 5 Brix, about 1 Brix to about 10 Brix, about 1 Brix to about 20 Brix, about 1 Brix to about 30 Brix, about 1 Brix to about 40 Brix, about 1 Brix to about 50 Brix, about 1 Brix to about 60 Brix, about 1 Brix to about 65 Brix, about 2 Brix to about 5 Brix, about 2 Brix to about 10 Brix, about 2 Brix to about 20 Brix, about 2 Brix to about 30 Brix, about 2 Brix to about 40 Brix, about 2 Brix to about 50 Brix, about 2 Brix to about 60 Brix, about 2 Brix to about 65 Brix, about 5 Brix to about 10 Brix, about 5 Brix to about 20 Brix, about 5 Brix to about 30 Brix, about 5 Brix to about 40 Brix, about 5 Brix to about 50 Brix, about 5 Brix to about 60 Brix, about 5 Brix to about 65 Brix, about 10 Brix to about 20 Brix, about 10 Brix to about 30 Brix, about 10 Brix to about 40 Brix, about 10 Brix to about 50 Brix, about 10 Brix to about 60 Brix, about 10 Brix to about 65 Brix, about 20 to about 30 Brix, about 20 Brix to about 40 Brix, about 20 Brix to about 50 Brix, about 20 Brix to about 60 Brix, about 20 Brix to about 65 Brix, about 30 to about 40 Brix, about 30 Brix to about 50 Brix, about 30 Brix to about 60 Brix, about 30 Brix to about 65 Brix, about 40 to about 50 Brix, about 40 Brix to about 60 Brix, about 40 Brix to about 65 Brix, about 50 to about 60 Brix, about 50 to about 65 Brix, about 60 to about 65 Brix, or about 1 Brix, 2 Brix, 4 Brix, 10 Brix, 20 Brix, 30 Brix, 40 Brix, 50 Brix, 60 Brix, or 65 Brix. In some examples, a composition for treating plant diseases as described herein may be a dry composition.

In some examples, a composition for treating plant diseases as described herein includes anthocyanins at 0 to 35,000 mg/kg, for example, about 0 mg/kg to about 5 mg/kg, about 0 mg/kg to about 25 mg/kg, about 0 mg/kg to about 50 mg/kg, about 0 mg/kg to about 100 mg/kg, about 0 mg/kg to about 500 mg/kg, about 0 mg/kg to about 1,000 mg/kg, about 0 mg/kg to about 2,500 mg/kg, about 0 mg/kg to about 5,000 mg/kg, about 0 to about 10,000 mg/kg, about 0 mg/kg to about 35,000 mg/kg, about 5 mg/kg to about 25 mg/kg, about 5 mg/kg to about 50 mg/kg, about 5 mg/kg to about 100 mg/kg, about 5 mg/kg to about 500 mg/kg, about 5 mg/kg to about 1,000 mg/kg, about 5 mg/kg to about 2,500 mg/kg, about 5 mg/kg to about 5,000 mg/kg, about 5 to about 10,000 mg/kg, about 5 mg/kg to about 35,000 mg/kg, about 25 mg/kg to about 50 mg/kg, about 25 mg/kg to about 100 mg/kg, about 25 mg/kg to about 500 mg/kg, about 25 mg/kg to about 1,000 mg/kg, about 25 mg/kg to about 2,500 mg/kg, about 25 mg/kg to about 5,000 mg/kg, about 25 to about 10,000 mg/kg, about 25 mg/kg to about 35,000 mg/kg, about 50 mg/kg to about 100 mg/kg, about 50 mg/kg to about 500 mg/kg, about 50 mg/kg to about 1,000 mg/kg, about 50 mg/kg to about 2,500 mg/kg, about 50 mg/kg to about 5,000 mg/kg, about 50 to about 10,000 mg/kg, about 50 mg/kg to about 35,000 mg/kg, about 100 mg/kg to about 500 mg/kg, about 100 mg/kg to about 1,000 mg/kg, about 100 mg/kg to about 2,500 mg/kg, about 100 mg/kg to about 5,000 mg/kg, about 100 to about 10,000 mg/kg, about 100 mg/kg to about 35,000 mg/kg, about 500 mg/kg to about 1,000 mg/kg, about 500 mg/kg to about 2,500 mg/kg, about 500 mg/kg to about 5,000 mg/kg, about 500 to about 10,000 mg/kg, about 500 mg/kg to about 35,000 mg/kg, about 1,000 mg/kg to about 2,500 mg/kg, about 1,000 mg/kg to about 5,000 mg/kg, about 1,000 to about 10,000 mg/kg, about 1,000 mg/kg to about 35,000 mg/kg, about 2,500 mg/kg to about 5,000 mg/kg, about 2,500 to about 10,000 mg/kg, about 2,500 mg/kg to about 35,000 mg/kg, about 5,000 to about 10,000 mg/kg, about 5,000 mg/kg to about 35,000 mg/kg, about 10,000 mg/kg to about 35,000 mg/kg, or about 0 mg/kg, about 5 mg/kg, about 25 mg/kg, about 50 mg/kg, about 100 mg/kg, about 500 mg/kg, about 1,000 mg/kg, about 2,500 mg/kg, about 5,000 mg/kg, about 10,000 mg/kg, or about 35,000 mg/kg.

In some examples, a composition for treating plant diseases as described herein includes proanthocyanidins (PACs) at 0 to 500,000 mg/kg, for example, about 0 mg/kg to about 2,500 mg/kg, about 0 mg/kg to about 5,000 mg/kg, about 0 mg/kg to about 10,000 mg/kg, about 0 mg/kg to about 25,000 mg/kg, about 0 mg/kg to about 50,000 mg/kg, about 0 mg/kg to about 75,000 mg/kg, about 0 mg/kg to about 100,000 mg/kg, about 0 mg/kg to about 200,000 mg/kg, about 0 mg/kg to about 300,000 mg/kg, about 0 mg/kg to about 400,000 mg/kg, about 0 mg/kg to about 500,000 mg/kg, about 2,500 mg/kg to about 5,000 mg/kg, about 2,500 mg/kg to about 10,000 mg/kg, about 2,500 mg/kg to about 25,000 mg/kg, about 2,500 mg/kg to about 50,000 mg/kg, about 2,500 mg/kg to about 75,000 mg/kg, about 2,500 mg/kg to about 100,000 mg/kg, about 2,500 mg/kg to about 200,000 mg/kg, about 2,500 mg/kg to about 300,000 mg/kg, about 2,500 mg/kg to about 400,000 mg/kg, about 2,500 mg/kg to about 500,000 mg/kg, about 5,000 mg/kg to about 10,000 mg/kg, about 5,000 mg/kg to about 25,000 mg/kg, about 5,000 mg/kg to about 50,000 mg/kg, about 5,000 mg/kg to about 75,000 mg/kg, about 5,000 mg/kg to about 100,000 mg/kg, about 5,000 mg/kg to about 200,000 mg/kg, about 5,000 mg/kg to about 300,000 mg/kg, about 5,000 mg/kg to about 400,000 mg/kg, about 5,000 mg/kg to about 500,000 mg/kg, about 10,000 mg/kg to about 25,000 mg/kg, about 10,000 mg/kg to about 50,000 mg/kg, about 10,000 mg/kg to about 75,000 mg/kg, about 10,000 mg/kg to about 100,000 mg/kg, about 10,000 mg/kg to about 200,000 mg/kg, about 10,000 mg/kg to about 300,000 mg/kg, about 10,000 mg/kg to about 400,000 mg/kg, about 10,000 mg/kg to about 500,000 mg/kg, about 25,000 mg/kg to about 50,000 mg/kg, about 25,000 mg/kg to about 75,000 mg/kg, about 25,000 mg/kg to about 100,000 mg/kg, about 25,000 mg/kg to about 200,000 mg/kg, about 25,000 mg/kg to about 300,000 mg/kg, about 25,000 mg/kg to about 400,000 mg/kg, about 25,000 mg/kg to about 500,000 mg/kg, about 50,000 mg/kg to about 75,000 mg/kg, about 50,000 mg/kg to about 100,000 mg/kg, about 50,000 mg/kg to about 200,000 mg/kg, about 50,000 mg/kg to about 300,000 mg/kg, about 50,000 mg/kg to about 400,000 mg/kg, about 50,000 mg/kg to about 500,000 mg/kg, about 75,000 mg/kg to about 100,000 mg/kg, about 75,000 mg/kg to about 200,000 mg/kg, about 75,000 mg/kg to about 300,000 mg/kg, about 75,000 mg/kg to about 400,000 mg/kg, about 75,000 mg/kg to about 500,000 mg/kg, about 100,000 mg/kg to about 200,000 mg/kg, about 100,000 mg/kg to about 300,000 mg/kg, about 100,000 mg/kg to about 400,000 mg/kg, about 100,000 mg/kg to about 500,000 mg/kg, about 200,000 mg/kg to about 300,000 mg/kg, about 200,000 mg/kg to about 400,000 mg/kg, about 200,000 mg/kg to about 500,000 mg/kg, about 300,000 mg/kg to about 400,000 mg/kg, about 300,000 mg/kg to about 500,000 mg/kg, about 400,000 mg/kg to about 500,000 mg/kg, or about 0 mg/kg, about 2,500 mg/kg, about 5,000 mg/kg, about 10,000 mg/kg, about 25,000 mg/kg, about 50,000 mg/kg, about 75,000 mg/kg, about 100,000 mg/kg, about 200,000 mg/kg, about 300,000 mg/kg, about 400,000 mg/kg, or about 500,000 mg/kg. The proanthocyanidin concentrations in Table 1 were measured using the Ocean Spray dimethylaminocinnamaldehyde (DMAC) method as described in U.S. Patent Application Publication 2017/0181458A1.

In some examples, a useful composition for treating plant diseases as described herein includes total phenolics at 0 to 700 mg/g, for example, about 0 mg/g to about 5 mg/g, about 0 mg/g to about 10 mg/g, about 0 mg/g to about 25 mg/g, about 0 mg/g to about 50 mg/g, about 0 mg/g to about 75 mg/g, about 0 mg/g to about 100 mg/g, about 0 mg/g to about 150 mg/g, about 0 mg/g to about 200 mg/g, about 0 mg/g to about 400 mg/g, about 0 mg/g to about 600 mg/g, about 0 mg/g to about 700 mg/g, about 5 mg/g to about 10 mg/g, about 5 mg/g to about 25 mg/g, about 5 mg/g to about 50 mg/g, about 5 mg/g to about 75 mg/g, about 5 mg/g to about 100 mg/g, about 5 mg/g to about 150 mg/g, about 5 mg/g to about 200 mg/g, about 5 mg/g to about 400 mg/g, about 5 mg/g to about 600 mg/g, about 5 mg/g to about 700 mg/g, about 10 mg/g to about 25 mg/g, about 10 mg/g to about 50 mg/g, about 10 mg/g to about 75 mg/g, about 10 mg/g to about 100 mg/g, about 10 mg/g to about 150 mg/g, about 10 mg/g to about 200 mg/g, about 10 mg/g to about 400 mg/g, about 10 mg/g to about 600 mg/g, about 10 mg/g to about 700 mg/g, about 25 mg/g to about 50 mg/g, about 25 mg/g to about 75 mg/g, about 25 mg/g to about 100 mg/g, about 25 mg/g to about 150 mg/g, about 25 mg/g to about 200 mg/g, about 25 mg/g to about 400 mg/g, about 25 mg/g to about 600 mg/g, about 25 mg/g to about 700 mg/g, about 50 mg/g to about 75 mg/g, about 50 mg/g to about 100 mg/g, about 50 mg/g to about 150 mg/g, about 50 mg/g to about 200 mg/g, about 50 mg/g to about 400 mg/g, about 50 mg/g to about 600 mg/g, about 50 mg/g to about 700 mg/g, about 75 mg/g to about 100 mg/g, about 75 mg/g to about 150 mg/g, about 75 mg/g to about 200 mg/g, about 75 mg/g to about 400 mg/g, about 75 mg/g to about 600 mg/g, about 75 mg/g to about 700 mg/g, about 100 mg/g to about 150 mg/g, about 100 mg/g to about 200 mg/g, about 100 mg/g to about 400 mg/g, about 100 mg/g to about 600 mg/g, about 100 mg/g to about 700 mg/g, about 150 mg/g to about 200 mg/g, about 150 mg/g to about 400 mg/g, about 150 mg/g to about 600 mg/g, about 150 mg/g to about 700 mg/g, about 200 mg/g to about 400 mg/g, about 200 mg/g to about 600 mg/g, about 200 mg/g to about 700 mg/g, about 400 mg/g to about 600 mg/g, about 400 mg/g to about 700 mg/g, about 600 mg/g to about 700 mg/g, or about 0 mg/g, about 5 mg/g, about 10 mg/g, about 25 mg/g, about 50 mg/g, about 75 mg/g, about 100 mg/g, about 150 mg/g, about 200 mg/g, about 400 mg/g, about 600 mg/g, or about 700 mg/g. Total phenolics for the compositions described herein were measured by the Folin-Ciocalteu method.

In some examples, a composition for treating plant diseases as described herein includes citric acid at 0% to 20%, for example, about 0% to about 0.5%, about 0% to about 1%, about 0% to about 1.5%, about 0% to about 2%, about 0% to about 2.5%, about 0% to about 3%, about 0% to about 4%, about 0% to about 5%, about 0% to about 5%, about 0% to about 10%, about 0% to about 15%, about 0% to about 20%, about 0.1% to about 0.5%, about 0.1% to about 1%, about 0.1% to about 1.5%, about 0.1% to about 2%, about 0.1% to about 2.5%, about 0.1% to about 3%, about 0.1% to about 4%, about 0.1% to about 5%, about 0.1% to about 5%, about 0.1% to about 10%, about 0.1% to about 15%, about 0.1% to about 20%, about 0.5% to about 1%, about 0.5% to about 1.5%, about 0.5% to about 2%, about 0.5% to about 2.5%, about 0.5% to about 3%, about 0.5% to about 4%, about 0.5% to about 5%, about 0.5% to about 5%, about 0.5% to about 10%, about 0.5% to about 15%, about 0.5% to about 20%, about 1% to about 1.5%, about 1% to about 2%, about 1% to about 2.5%, about 1% to about 3%, about 1% to about 4%, about 1% to about 5%, about 1% to about 5%, about 1% to about 10%, about 1% to about 15%, about 1% to about 20%, about 1.5% to about 2%, about 1.5% to about 2.5%, about 1.5% to about 3%, about 1.5% to about 4%, about 1.5% to about 5%, about 1.5% to about 5%, about 1.5% to about 10%, about 1.5% to about 15%, about 1.5% to about 20%, about 2% to about 2.5%, about 2% to about 3%, about 2% to about 4%, about 2% to about 5%, about 2% to about 5%, about 2% to about 10%, about 2% to about 15%, about 2% to about 20%, about 2.5% to about 3%, about 2.5% to about 4%, about 2.5% to about 5%, about 2.5% to about 5%, about 2.5% to about 10%, about 2.5% to about 15%, about 2.5% to about 20%, about 3% to about 4%, about 3% to about 5%, about 3% to about 5%, about 3% to about 10%, about 3% to about 15%, about 3% to about 20%, about 4% to about 5%, about 4% to about 10%, about 4% to about 15%, about 4% to about 20%, about 5% to about 10%, about 5% to about 15%, about 5% to about 20%, about 10% to about 15%, about 10% to about 20%, about 15% to about 20%, or about 0.1%, about 0.5%, about 1%, about 1.5%, about 2%, about 2.5%, about 3%, about 4%, about 5%, about 10%, about 15%, or about 20%

In some examples, a composition for treating plant diseases as described herein includes malic acid at 0% to 20%, for example, about 0% to about 0.5%, about 0% to about 1%, about 0% to about 1.5%, about 0% to about 2%, about 0% to about 2.5%, about 0% to about 3%, about 0% to about 4%, about 0% to about 5%, about 0% to about 5%, about 0% to about 10%, about 0% to about 15%, about 0% to about 20%, about 0.1% to about 0.5%, about 0.1% to about 1%, about 0.1% to about 1.5%, about 0.1% to about 2%, about 0.1% to about 2.5%, about 0.1% to about 3%, about 0.1% to about 4%, about 0.1% to about 5%, about 0.1% to about 5%, about 0.1% to about 10%, about 0.1% to about 15%, about 0.1% to about 20%, about 0.5% to about 1%, about 0.5% to about 1.5%, about 0.5% to about 2%, about 0.5% to about 2.5%, about 0.5% to about 3%, about 0.5% to about 4%, about 0.5% to about 5%, about 0.5% to about 5%, about 0.5% to about 10%, about 0.5% to about 15%, about 0.5% to about 20%, about 1% to about 1.5%, about 1% to about 2%, about 1% to about 2.5%, about 1% to about 3%, about 1% to about 4%, about 1% to about 5%, about 1% to about 5%, about 1% to about 10%, about 1% to about 15%, about 1% to about 20%, about 1.5% to about 2%, about 1.5% to about 2.5%, about 1.5% to about 3%, about 1.5% to about 4%, about 1.5% to about 5%, about 1.5% to about 5%, about 1.5% to about 10%, about 1.5% to about 15%, about 1.5% to about 20%, about 2% to about 2.5%, about 2% to about 3%, about 2% to about 4%, about 2% to about 5%, about 2% to about 5%, about 2% to about 10%, about 2% to about 15%, about 2% to about 20%, about 2.5% to about 3%, about 2.5% to about 4%, about 2.5% to about 5%, about 2.5% to about 5%, about 2.5% to about 10%, about 2.5% to about 15%, about 2.5% to about 20%, about 3% to about 4%, about 3% to about 5%, about 3% to about 5%, about 3% to about 10%, about 3% to about 15%, about 3% to about 20%, about 4% to about 5%, about 4% to about 10%, about 4% to about 15%, about 4% to about 20%, about 5% to about 10%, about 5% to about 15%, about 5% to about 20%, about 10% to about 15%, about 10% to about 20%, about 15% to about 20%, or about 0.1%, about 0.5%, about 1%, about 1.5%, about 2%, about 2.5%, about 3%, about 4%, about 5%, about 10%, about 15%, or about 20%.

In some examples, a composition for treating plant diseases as described herein includes quinic acid at 0% to 14%, for example, about 0% to about 0.5%, about 0% to about 1%, about 0% to about 1.5%, about 0% to about 2%, about 0% to about 2.5%, about 0% to about 3%, about 0% to about 4%, about 0% to about 5%, about 0% to about 5%, about 0% to about 10%, about 0% to about 14%, about 0.1% to about 0.5%, about 0.1% to about 1%, about 0.1% to about 1.5%, about 0.1% to about 2%, about 0.1% to about 2.5%, about 0.1% to about 3%, about 0.1% to about 4%, about 0.1% to about 5%, about 0.1% to about 5%, about 0.1% to about 10%, about 0.1% to about 14%, about 0.5% to about 1%, about 0.5% to about 1.5%, about 0.5% to about 2%, about 0.5% to about 2.5%, about 0.5% to about 3%, about 0.5% to about 4%, about 0.5% to about 5%, about 0.5% to about 5%, about 0.5% to about 10%, about 0.5% to about 14%, about 1% to about 1.5%, about 1% to about 2%, about 1% to about 2.5%, about 1% to about 3%, about 1% to about 4%, about 1% to about 5%, about 1% to about 5%, about 1% to about 10%, about 1% to about 14%, about 1.5% to about 2%, about 1.5% to about 2.5%, about 1.5% to about 3%, about 1.5% to about 4%, about 1.5% to about 5%, about 1.5% to about 5%, about 1.5% to about 10%, about 1.5% to about 14%, about 2% to about 2.5%, about 2% to about 3%, about 2% to about 4%, about 2% to about 5%, about 2% to about 5%, about 2% to about 10%, about 2% to about 14%, about 2.5% to about 3%, about 2.5% to about 4%, about 2.5% to about 5%, about 2.5% to about 5%, about 2.5% to about 10%, about 2.5% to about 14%, about 3% to about 4%, about 3% to about 5%, about 3% to about 5%, about 3% to about 10%, about 3% to about 14%, about 4% to about 5%, about 4% to about 10%, about 4% to about 15%, about 4% to about 20%, about 5% to about 10%, about 5% to about 14%, about 10% to about 14%, or about 0.1%, about 0.5%, about 1%, about 1.5%, about 2%, about 2.5%, about 3%, about 4%, about 5%, about 10%, or about 14%.

In some examples, a composition for treating plant diseases as described herein includes benzoic acid at 0 to 30,000 ppm, for example, about 0 ppm to about 1,000 ppm, about 0 ppm to about 2,000 ppm, about 0 ppm to about 5,000 ppm, about 0 ppm to about 10,000 ppm, about 0 ppm to about 15,000 ppm, about 0 ppm to about 20,000 ppm, about 0 ppm to about 25,000 ppm, about 0 to about 30,000 ppm, about 1,000 ppm to about 5,000 ppm, about 1,000 ppm to about 10,000 ppm, about 1,000 ppm to about 15,000 ppm, about 1,000 ppm to about 20,000 ppm, about 1,000 ppm to about 25,000 ppm, about 1,000 to about 30,000 ppm, about 2,000 ppm to about 5,000 ppm, about 2,000 ppm to about 10,000 ppm, about 2,000 ppm to about 15,000 ppm, about 2,000 ppm to about 20,000 ppm, about 2,000 ppm to about 25,000 ppm, about 2,000 to about 30,000 ppm, about 5,000 ppm to about 10,000 ppm, about 5,000 ppm to about 15,000 ppm, about 5,000 ppm to about 20,000 ppm, about 5,000 ppm to about 25,000 ppm, about 5,000 to about 30,000 ppm, about 10,000 ppm to about 15,000 ppm, about 10,000 ppm to about 20,000 ppm, about 10,000 ppm to about 25,000 ppm, about 10,000 to about 30,000 ppm, about 15,000 ppm to about 20,000 ppm, about 15,000 ppm to about 25,000 ppm, about 15,000 to about 30,000 ppm, about 20,000 ppm to about 25,000 ppm, about 20,000 to about 30,000 ppm, about 25,000 ppm to about 30,000 ppm, or about 0 ppm, about 1,000 ppm, about 2,000 ppm, about 5,000 ppm, about 10,000 ppm, about 15,000 ppm, about 20,000 ppm, about 25,000 ppm, or about 30,000 ppm.

Based on a desired application method for delivering the compositions to the plant, as will be described below, the compositions described above may be diluted or concentrated accordingly. Skilled practitioners will appreciate that compositions may also include one or more additives, e.g., antibiotics, such as amoxicillin, amphotericin, ampicillin, ceftriaxone, chloramphenicol, ciprofloxacin, clotrimazole, gentamycin, ketoconazole, mupirocin, oxytetracycline, sulphadimethoxin, streptomycin, vancomycin, or any combination thereof, surfactants, such as nonionic surfactants, for example, alcohol alkoxylates, alkyl amine ethoxylates, alkyl phenol ethoxylates, oil based or fatty acid or sorbitan ethoxylates, polyalkene oxide copolymers, or any combinations thereof. Alternatively or in addition, anionic surfactants may be used, such as, alkyl benzene sulfonates, alkyl naphthalene sulfonates, alkyl sulfonates, fatty acid sulfonates, lingo sulfonates and dioctyle sulfosuccinates, or any combinations thereof. Additives may include starch degrading enzymes, adjuvants, oils, etc. Skilled practitioners will appreciate that including additives may affect the composition property ranges described above.

Skilled practitioners will appreciate the composition may be in a concentrated, diluted, or dried form. For example, the compositions as described herein may be concentrated to a powder that retains the same ratio of components (e.g., PACs, total phenolics, acids, etc.) as described. Depending on the form of the composition, more or less of the composition may be required for application to an affected plant.

Methods for Measuring Phenolics in Compositions

Total phenolics for the compositions described herein were measured by the Folin-Ciocalteu method. In an exemplary method, Folin-Ciocalteu Phenol Reagent 2N (MP Biomedical LLC), was diluted to 10× solution in deionized water and stored in an amber bottle. Anhydrous sodium carbonate (Sigma-Aldrich) was dissolved in deionized water to a 7.5% solution then placed on a heated stir plate until well-mixed. The mixture was left to cool to room temperature then stored in an amber bottle. Samples were diluted in deionized water. 100 uL of the prepared samples were added to glass culture tubes. 100 ul of deionized water was added to a glass culture tube to be used as a blank. 3.9 ml of deionized water was then added to each tube and vortexed. 250 uL of 10×2N Folin-Ciocalteu reagent was then added to each glass culture tube then vortexed. 750 uL of 7.5% sodium carbonate solution was added to each glass culture tube then vortexed. The samples were then stored in a dark cabinet for 30 minutes. The samples were taken out then measured at 765 nm on a Hach DR3900 (1.13 cm path length) using the deionized water sample as a blank (Singleton, V. and Rossi, J. 1965. Colorimetry of Total Phenolics with Phosphomolybdic-Phosphotungstic Acid Reagents. *Am J Eno and Vitic.* 16: 144-158.).

0.5% gallic acid (Sigma-Aldrich) solution was prepared. A standard curve was made containing 0-200 mg/L and measured as stated above. Any sample result that was out of range of the standard curves absorbance range was rerun at a better dilution to achieve an absorbance within the standard curve range. A control sample that had been tested and verified was also measured each run. Results are reported as mg/g Gallic Acid Equivalent (GAE).

Methods for Measuring Organic Acids in Compositions

Analyses of organic acid contents of the compositions described herein were performed on a Dionex ICS-2100 Ion Chromatography System (Thermo Scientific Sunnyvale, CA, USA) equipped with an EG40 Eluent Generator, an ASRS 300, 4 mm suppressor, and a CR-ATC. The separation of the organic acids was carried out on a RFIC IonPac AS11-HC, Analytical, 4×250 mm ion exchange column, connected from a RFIC IonPac AG11-HC, 4×50 mm guard column and measured by suppressed conductivity detection. A stock standard containing citric acid, fumaric acid, galactronic acid, isocitric acid, malic acid, and quinic acid is prepared in deionized water to a concentration of 5%. The stock standard is then diluted to prepare working standards of 5, 25, and 50 mg/L, which are used to calibrate the instrument.

Methods for Measuring Proanthocyanidins in Compositions

The levels of PACs in the compositions described herein have been assessed or quantified using Ocean Spray's dimethylaminocinnameldehyde (DMAC) method, which utilizes PACs fractionated from specific cranberry sources as a standard. See, e.g., Martin et al., Food Res Int 71:68-82, 2015; and de Pascual-Teresa et al., J Agric Food Chem 46:4209-4213, 1998, which are hereby incorporated by reference. Skilled practitioners will appreciate that other methods can be used. For example, Brunswick Labs uses a pure commercially available procyanidin A-2/B-2 standard (dimer) as a standard. See, e.g., Prior et al., J Sci Food Agric 90:1473-1478, 2010. When a sample is tested for PACs with Ocean Spray's method compared to Brunswick Labs' method, lower PAC values are consistently found using Brunswick Labs' method due to the lower molecular weight of the procyanidin A-2/B-2 standard compared to the fractionated PAC standard, which contains A-2/B-2 and all the higher molecular weight PAC oligomers and polymers present in cranberries. For example, a sample that has about 110 mg PACs when tested using Ocean Spray's DMAC method, may have only about 36 mg PACs when tested using Brunswick Labs' DMAC method.

Skilled practitioners will recognize that both methods measure the total PACs in a sample, but they differ only in how the results are expressed based on the chosen standard equivalency. Therefore, while the results may differ in using the two methods on the same sample, it does not mean that the levels are different. As a result, it is recommended that testing comparisons of the same material always be made using the same methodology so as to avoid confusion. Both methods are generally used in the industry. Nonetheless, Ocean Spray's method better represents the PACs found in cranberry and therefore, results obtained by this method are a truer representation of the 'real' amount of PACs in cranberry samples. Accordingly, all PAC values described herein are determined using Ocean Spray's DMAC method.

In an example of executing the Ocean Spray DMAC method, a Sephadex LH-20 column separation followed by the absorbance measurement of DMAC colorimetric reaction was used to determine PAC content in cranberry samples (Cunningham, D., Vannozzi, S., O'Shea, E., & Turk, R. 2002. *Quality Management of Nutraceuticals ACS Symposium series* 803, Washington D.C.). A 1.0 g aqueous sample was loaded onto a pre-hydrated Sephadex LH-20 polyprep column. Distilled water (10 mL), then 25% EtOH (10 mL) solution were used to elute off the sugars, organic acids, anthocyanins, and flavonols. These eluents were discarded. The columns were then washed sequentially with 70% acetone in water solution (2.5 mL then another 2.5 mL), collected, and combined in a 15 mL tube. The samples were vortexed then 1 mL of the sample was added to a glass culture tube. 1% DMAC (in 70/30 MeOH/HCl) was prepared with 3 mL being added to each culture tube, including reagent blank. The tubes were vortexed and then the absorbance was measured after 5 min at 640 nm on a Hach DR3900. The regent blank was used to zero the spectrophotometer. Samples needed to be in the optimal range of 0.2-0.8 with samples outside of this range being rerun with dilutions accordingly adjusted. The PACs concentrations of the samples were calculated as is and reported in mg/kg.

Sources for Disease Inhibiting Compositions

In addition to cranberry-derived compositions, skilled practitioners will appreciate compositions useful in the presently described methods may be made from another fruit or plant product with similar properties. For example, as an alternative to, or in addition to, components from cranberry plants, the composition may include compositions derived from blueberries, elderberries, chokeberries, lingonberries, raspberries, grapes, gooseberries, huckleberries, strawberries, blackberries, cloudberries, blackcurrants, redcurrants, white currants, and/or or any mixture thereof. In some examples, the composition may include compositions derived from cinnamon bark. Such compositions are referred to herein as blueberry, elderberry, chokeberry, lingonberry, raspberry, grape, gooseberry, huckleberry, strawberry, blackberry, cloudberry, blackcurrant, redcurrant, while currant, and cinnamon bark compositions, respectively.

The exemplary compositions from Table 1 were derived from cranberries, however, skilled practitioners will appreciate that compositions with similar Brix contents, citric, malic, and quinic acid contents, and/or phenolic contents (anthocyanins and PACs), may be produced from other fruit or plant products, such as those listed above. Additionally, skilled practitioners will appreciate that, in some instances, similar processes as those used in making the compositions described in Table 1 may be used on the fruit or plant products listed below. For example, countercurrent extraction may be performed on blueberries or other fruits to produce a similar CCE concentrate to the CCE concentrate produced from cranberries shown in Table 1.

Delivery to the Plant Phloem and Compositions for Such Delivery

Some plant diseases, such as HLB, are particularly difficult to treat because the plant pathogen, such as *CLas*, reside in the phloem. The phloem is the vascular tissue in plants that conducts sugars and other metabolic products downward from the leaves. In order to deliver the cranberry compositions so that they may contact, and thereby inhibit, pathogens residing in the phloem, the compositions may be mixed with additional ingredients, i.e., carriers, for improved transport to the phloem. Carriers may include adjuvants. Adjuvants may be activator adjuvants (improving the activity of cranberry component) or modifier adjuvants (improving the shelf-life, handling, and application of cranberry components).

In one example of using an activator adjuvant, compositions, such as cranberry compositions, may be mixed with surfactants for better spreading ability and flow. Surfactants generally lower the surface tension between two liquids (or between a liquid and a solid) and may allow better delivery of compositions to the cuticle of the leaves and/or to the phloem. Useful surfactants include, e.g., nonionic surfactants, such as alcohol alkoxylates, alkyl amine ethoxylates, alkyl phenol ethoxylates, oil based or fatty acid or sorbitan ethoxylates, polyalkene oxide copolymers, or any combinations thereof. Alternatively or in addition, anionic surfactants may be used, such as, alkyl benzene sulfonates, alkyl naphthalene sulfonates, alkyl sulfonates, fatty acid sulfonates, lingo sulfonates and dioctyle sulfosuccinates, or any combinations thereof.

In one example of using a modifier adjuvant, compositions, such as cranberry compositions, may have additional benzoic acid, propionic acid, sorbic acid and/or their salts, parabens, such as methyl, ethyl, butyl and propyl paraben, butylated hydroxyanisol (BHA), butylated hydroxytoluene (BHT) or combination thereof to improve the shelf-life of the composition.

In another example of using a modifier adjuvant, compositions, such as cranberry compositions, may include water that has been treated with, for example, polyglucosides, polyglycosides, polyoxyethylene glycol or their derivatives, ammonium salts, citrophosphate, glycerol acids, hydroxy carboxylic acids, phosphate esters, phosphoric acid, polycarboxylic acid, polyacrylic acid, sulfates, urea or any combination thereof.

In another example, oils, such as mineral oil (petroleum based), horticultural oil, or vegetable oils (seed oils) and their esterified derivatives, or oil mixtures, may be used as adjuvants. An emulsifier may be used to mix hydrophilic ingredients with oil. The emulsion formed may be an emulsion, a microemulsion, or a nanoemulsion. Oils may allow easier transport to the phloem as they may mask the polarity of compositions, such as cranberry compositions.

In another example, ammonium salts, such as ammonium sulfate, may be used as an adjuvant. The ammonium salts are believed to improve the absorption of pesticides.

In another example, starch degrading enzymes, such as α-amylase may be added to the cranberry composition. Because the HLB bacteria, *CLas*, produces starchy materials within the phloem, introduction of a starch degrading enzyme may improve delivery of cranberry compositions throughout the phloem. Additionally, introduction of a starch degrading enzyme may provide additional space for the cranberry compositions to contact *CLas*, improving inhibition of the bacteria.

In another example, a tannase enzyme may be added to the cranberry composition. A tannase enzyme may be, for example, Sumizyme TAN. The tannase enzyme aids in hydrolyzing PACs present in the cranberry compositions to smaller molecular weights. A larger number of smaller molecular weight PAC molecules may not only improve the efficacy of inhibition but also are more likely to reach the phloem where the disease causing pathogens, such as bacteria and vectors, reside.

In another example, the composition may include one or more buffers, such as citrate, and/or malate to slightly increase the pH of the composition. Hydroxides of sodium and potassium can be used to create citrate and malate buffers due to citric and malic acid already being present in the composition. In other cases, a commercially available buffer, such as phosphate and Imidazole-HCl may be added to the composition.

In another example, the composition may include β-aminobutyric acid (BABA), 2-Deoxy-D-glucose (DDG), salicylic acid (SA), oxalic acid (OA), trehalose, or trehalose-6-phosphate, or any mixture and/or salts thereof. Such compounds may act as hormones to revive the tree tissues damaged by HLB.

In some examples, adjuvants that are included in the composition may be naturally-derived. Naturally derived adjuvants include, but are not limited to, oils including horticultural and vegetable oils and surfactants including *yucca* extract, castile soap, soapwort, and quillaja bark extract. Compositions, e.g., cranberry compositions, that include only naturally-derived ingredients may be used in organic farming to produce organic plant products.

Methods of Administering Compositions to Plants

Figure 2:
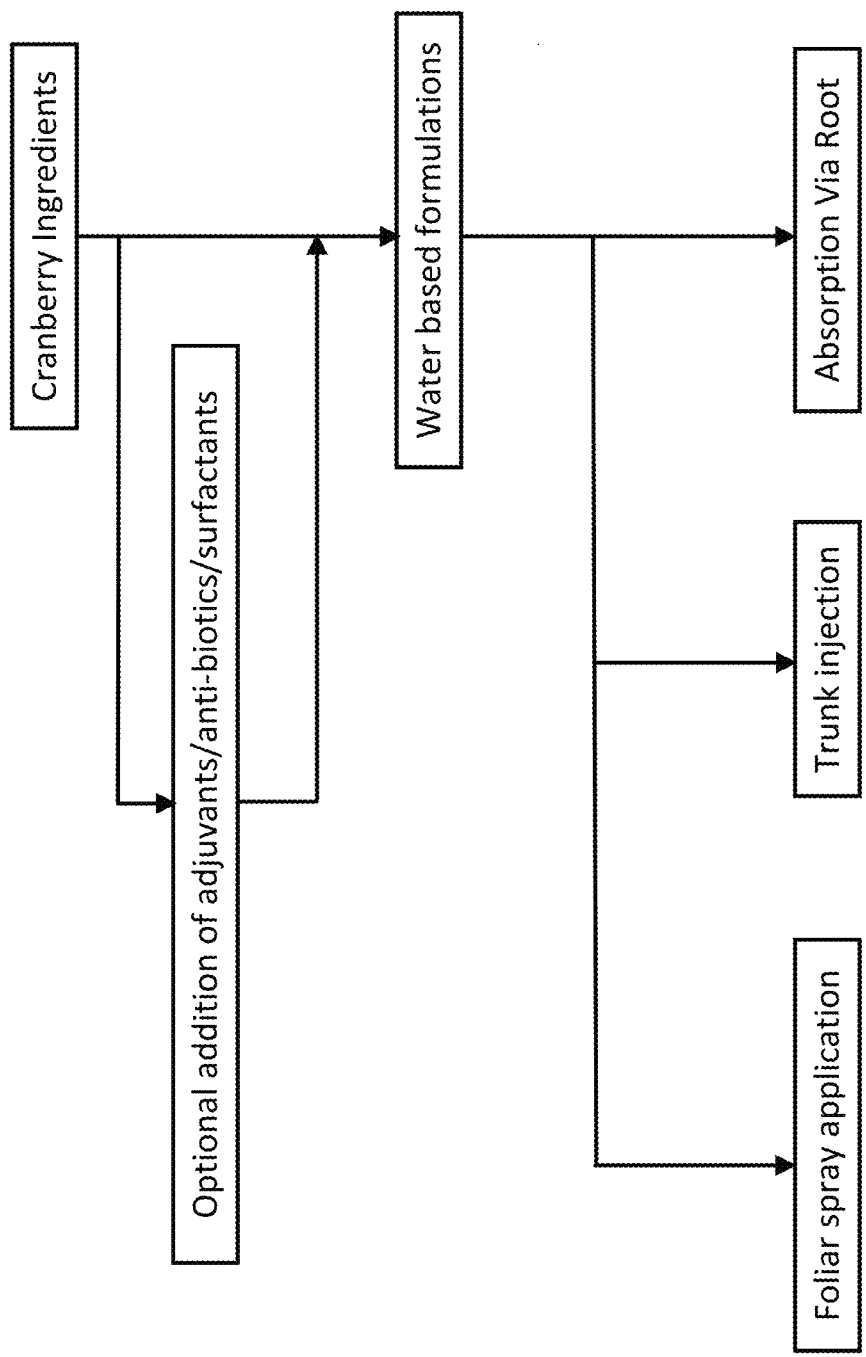
FIG. 2 is a flow chart for a method of treating plants affected with HLB with cranberry compositions.

Compositions may be applied to plants in a variety of ways, as illustrated in FIG. 2. For example, cranberry compositions may be applied to citrus plants via spraying. Mechanical or hydraulic sprayers consisting of a tank, a pump, a lance (for single nozzles) or boom, and a nozzle (or multiple nozzles) may be used. For example, cranberry ingredients in liquid form may be spread on the foliage as droplets under pressure, which may be large rain-type drops or tiny almost-invisible particles. A schematic of a spraying system for treating an affected plant with cranberry compositions is illustrated in FIG. 1. Additionally or alternatively, cranberry compositions may be applied to affected plants, or the surrounding soil using aerosols, liquids, sprays, or injections. Cranberry compositions may be applied via brushing the compositions onto leaves or other portions of the plants or applied by hand to the plants.

Compositions described herein may be introduced via trunk implantation or trunk injection. Injection or implantation of the composition directly into the trunk may aid in delivering the composition to the phloem of the plant. Because of the composition's proximity to the phloem when the composition is injected or implanted into the trunk, disease inhibiting results may be produced faster than via other application methods. Additionally, compositions with higher concentrations of larger molecules (e.g. PACs), may benefit from being injected or implanted into the trunk as these larger molecules do not have to diffuse as far to reach the bacteria in the phloem.

Compositions may be introduced to plants via soil injection, soil drenching, soil doping, and/or soil basal spray. The compositions may be absorbed into the plant by the roots and delivered to the phloem.

Compositions may be included in solid compositions such as spikes, pellets, powders, dusts, etc. Compositions may be mixed with fertilizers or soils. Compositions mixed into fertilizers or soils mixes may be solid (e.g., pellets, powders) or liquid (e.g., solutions, slurries, gels). In some implementations, a solid composition may be configured to dissolve upon contact with water, e.g., as time release formulation. When the solid composition is contacted with water, the composition may be released into soil surrounding a plant and to be absorbed by the plant. Solid compositions, e.g., fertilizers, pellets, spikes, may be configured to release a predetermined dose of compositions over a set amount of time. Skilled practitioners will appreciate that dosing from these solid compositions may be set based on a level of infection, a type of plant, a soil environment, etc.

Depending on the treatment method used, varying amounts of the composition can be applied to the plant. Additionally, an amount or frequency of application of the composition may be affected by an age of the plant or a severity of the disease being treated.

Psyllid Treatment

Compositions described herein may be used to inhibit *CLas* bacteria growing in the gut of psyllids, specifically Asian Citrus Psyllids (ACPs). Psyllids transfer *CLas* bacteria between plants as they move between and feed on the plants. As a psyllid ingests plant tissue that has been treated with a cranberry composition, the antibacterial properties of the cranberry composition may inhibit *CLas* bacteria growing in the gut of the psyllid. A psyllid that is lacking *CLas* bacteria in its gut does not transfer the bacteria from plant to plant. As such, as psyllids ingest the plant tissue of treated plants, and the bacteria carried by the psyllids are inhibited, disease spread may be limited.

While traditional insecticides aim to repel psyllids from plants to prevent disease spread, in some cases, it may be beneficial to attract psyllids to treated plants so the bacteria being carried by the psyllids may be inhibited. Compositions that are attractive to psyllids, for example citric acid, may be included in the cranberry composition. Volatile compositions that attract psyllids may also be used. For example, psyllids are also attracted to the Indian Curry Leaf, *Bergera koenigii*. The volatile compositions of these plants may also be added to the cranberry ingredients to increase psyllid attraction.

Skilled practitioners will appreciate that the compositions described herein can be used for other phloem bound vectors, such as leafhoppers and xylem bound vectors, such as sharpshooters. Plant pathogens can also be inhibited in vectors, such as aphids, plant hoppers, mealy bugs, whiteflies, and membracids.

A trap that includes a composition as described herein may also be used to attract the vector and inhibit the vector gut pathogens.

Integrated Pest Management Systems

The presently describe methods may be utilized as part of an integrated pest management (IPM) program. Integrated pest management programs including cranberry composition treatments, for example, include the treatment of the plants and the vectors with cranberry ingredients along with biological control, mechanical, cultural, physical/environmental modification, and host resistance or genetic manipulation. For example, cranberry compositions may be administered along with antibiotics. Antibiotics that may be used with compositions described herein include oxytetracycline, streptomycin, amoxicillin, amphotericin, ampicillin, ceftriaxone, chloramphenicol, ciprofloxacin, clotrimazole, gentamycin, ketoconazole, mupirocin, sulphadimethoxin, vancomycin or any combination thereof. This combination may allow reduction of the overall amount of antibiotics used in treating the citrus plants. For example, introducing cranberry compositions could reduce the amount of agricultural streptomycin (Firewall®) and agricultural oxytetracycline (Fireline®) applied to the plants due to a synergistic effect between the antibiotics and the cranberry compositions.

EXAMPLES

Example 1: In Vitro Inhibitory Activity of Cranberry Compositions

*Liberibacter crescens* is the closest cultured relative to *Candidatus Liberibacter asiaticus* (*CLas*), the suggested causative agent of citrus greening, or Huanglongbing (HLB). An example assay was performed to contact *Liberibacter crescens* with the various cranberry extracts described herein in differing concentrations. The purpose of this assay was to identify agents that may inhibit growth of the pathogen and stop the spread of HLB. Since *CLas* cannot grow outside of its hosts, *L. crescens* was used as a surrogate to test possible treatments.

In an example assay procedure, *L. crescens* was cultured in 2 mL BM7 medium in small test tubes to exponential phase (3-4 days). The BM7 medium includes α-Ketoglutarate (2 g), ACES buffer (10 g), KOH (3.75 g), and distilled water (550 mL) (after sterilization and cooling of this medium, 150 mL of fetal bovine serum and 300 mL of TMN-FH Medium (Sigma T1032) is added to form the BM7 medium). 500 ul of grown cells in exponential phase were added to 20 mL fresh BM7 and aliquoted into 96 well plates. *L. crescens* cultures were then treated with the test composition (here, a cranberry extract) at the different concentrations being tested in triplicate, and the cultures were incubated.

After incubation, an appropriate sample of the culture was transferred and Presto Blue™ Cell Viability Reagent was added to each sample. Presto Blue™ Cell Viability Reagent utilizes a resazurin-based blue, non-fluorescent compound that is reduced to resorfuin, a red fluorescent compound, in the cytosol of a viable cell. The measure of fluorescence reflects conversion of the compound and is proportional to the amount of metabolically active cells. After adding Presto Blue™ Cell Viability Reagent to each sample, samples were incubated and then the fluorescence of each sample was read using an HT synergy biotek microplate reader.

Upon gathering the fluorescence data, the replicate wells (those treated with the same compound at the same concentration) were averaged and the readings were normalized by subtracting the average fluorescence from media only wells. The fluorescence data was then compared to no treatment wells to find a relative percent inhibition for each plate. As such, exact readings are not comparable between runs, but the relative percentages are comparable. Inhibition results for 20%, 10%, and 5% dilutions of various cranberry extracts are shown below in Table 2.

TABLE 2

Liberibacter crescens Inhibition Using Cranberry Extracts.

| Type of Extract | Dilution | Inhibition | Dilution | Inhibition | Dilution | Inhibition |
|---|---|---|---|---|---|---|
| CCE Conc. | 20% | 15.44 | 10% | 8.15 | 5% | 1.54 |
| Mash Conc. | 20% | 79.23 | 10% | 36.36 | 5% | 12.38 |
| Resin Extract | 20% | 100.79 | 10% | 100.06 | 5% | 94.83 |
| UF retentate | 20% | 99.26 | 10% | 96.92 | 5% | 87.06 |
| SWE of Presscake | 20% | 100.04 | 10% | 98.21 | 5% | 95.36 |
| SWE of Leaves | 20% | 99.65 | 10% | 97.51 | 5% | 92.02 |
| SWE of Fruit (Full Acid) | 20% | 96.40 | 10% | 89.62 | 5% | 70.17 |
| SWE of Fruit (Partial Acid) | 20% | 97.41 | 10% | 95.49 | 5% | 83.64 |

As shown in Table 2, a variety of cranberry extracts, when contacting Liberibacter crescens, produced inhibition of 80% or more. Cranberry extract dilutions that produced between 80% and 90% inhibition are shaded in light grey, and cranberry extract dilutions that produced greater than 90% inhibition are shaded in dark grey. Without intending to be bound by theory, it is believed that PACs and phenolics have a larger impact on the inhibition of Liberibacter crescens than the acids in the cranberry extracts, e.g. malic, citric, and quinic acid. However, it is also believed that weak acids that are present in cranberry extracts may be beneficial in delivering the cranberry extract into the phloem due to the lower dissociation constants of weak acids. The dilutions shown in Table 2 correspond to dilutions of the compositions similar to example compositions shown in Table 1, which are about 20 Brix. Therefore, the 20% dilution corresponds to about 4 Brix, the 10% dilution corresponds to about 2 Brix, and the 5% dilution corresponds to about 1 Brix.

Example 2: In Vitro Inhibitory Activity of Cranberry Compositions

Figure 3:
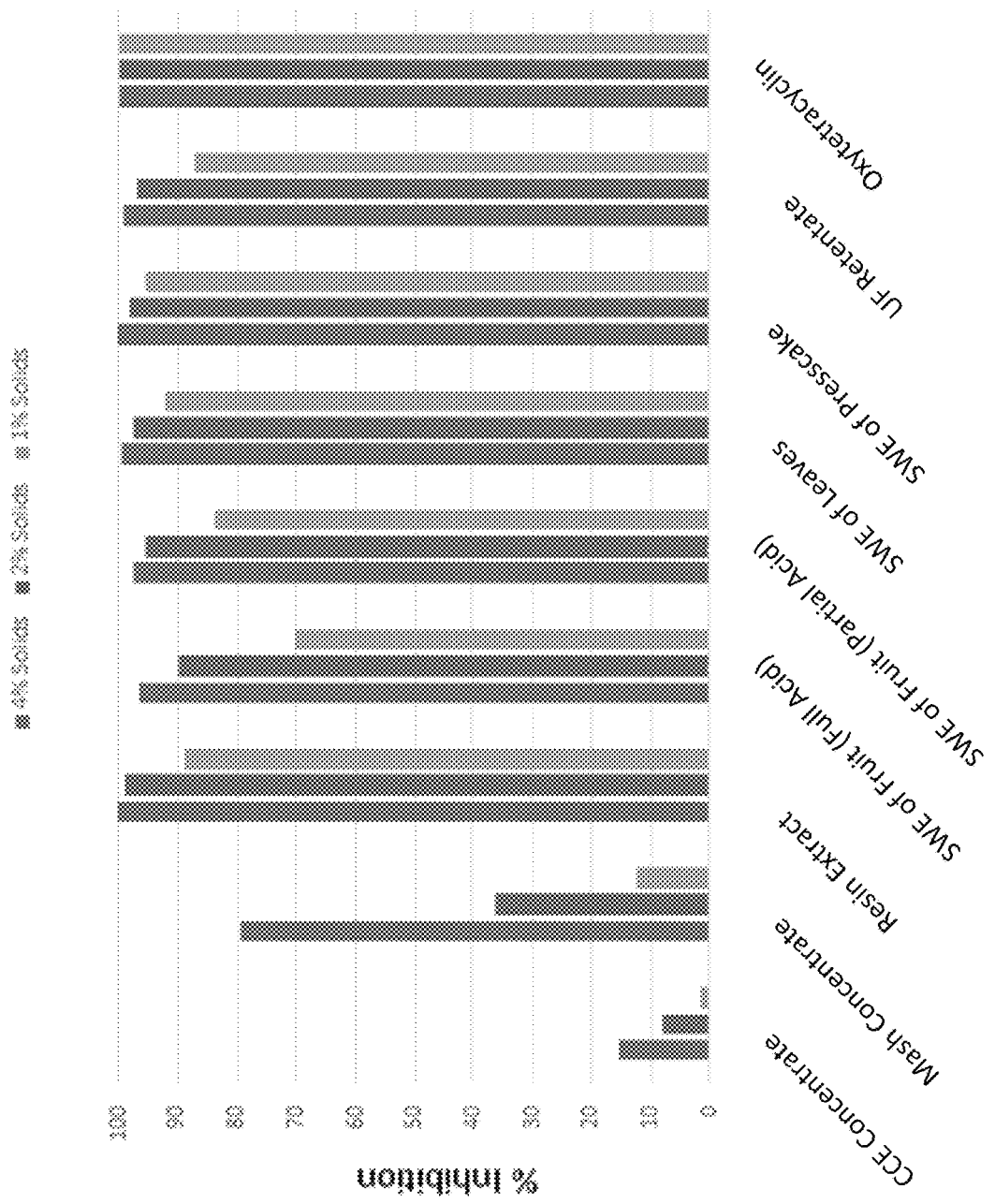
FIG. 3 is a bar graph showing percent inhibition of *L. crescens* in vitro with various cranberry compositions at 1, 2, and 4% solids concentrations.
Figure 4:
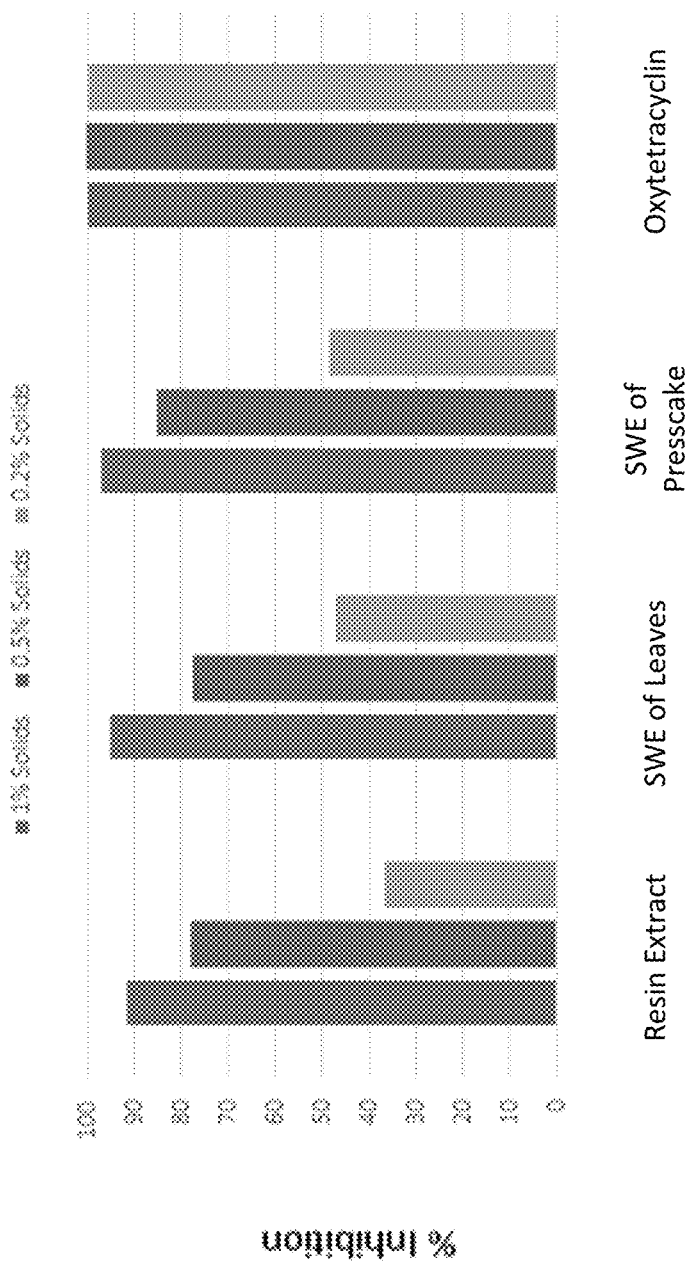

Cranberry compositions at 0.2%, 0.5%, 1%, 2% and 4% solids content were tested to determine inhibitory properties of each cranberry composition, as shown in FIGS. 3 and 4. These cranberry compositions were produced via the processes described in Example 1. The minimum inhibitory concentration was 1 Brix (1% solids content) for each of the cranberry compositions. Oxytetracyclin was used as a control and provided 100% inhibition at each tested level.

Example 3: In Vivo Inhibitory Activity of Cranberry Compositions

Three cranberry compositions, Resin Extract, Resin Extract and Tannase, and SWE of Presscake Extract were each added as soil drench to ten young citrus plants with average trunk diameters of 0.7 cm. Each cranberry composition had a solids content of 10 Brix. Water and streptomycin were used as negative and positive controls, respectively. Leaf samples were collected (three per plant) immediately prior to application of the cranberry compositions. qPCR was conducted on the pre-treatment leaf samples as well as leaf samples collected at two days, fourteen days, and twenty-eight days post treatment.

The qPCR process was completed in an Applied Biosystems 7500 Fast Real-Time PCT System. Each reactions was conducted with 1 µL of sample DNA in a total reaction volume of 26 µL. The cox2 gene was measured as an internal plant control. After initial application of the cranberry compositions, the plants were tested for CLas by qRT-PCR and for visual toxicity.

Figure 5:
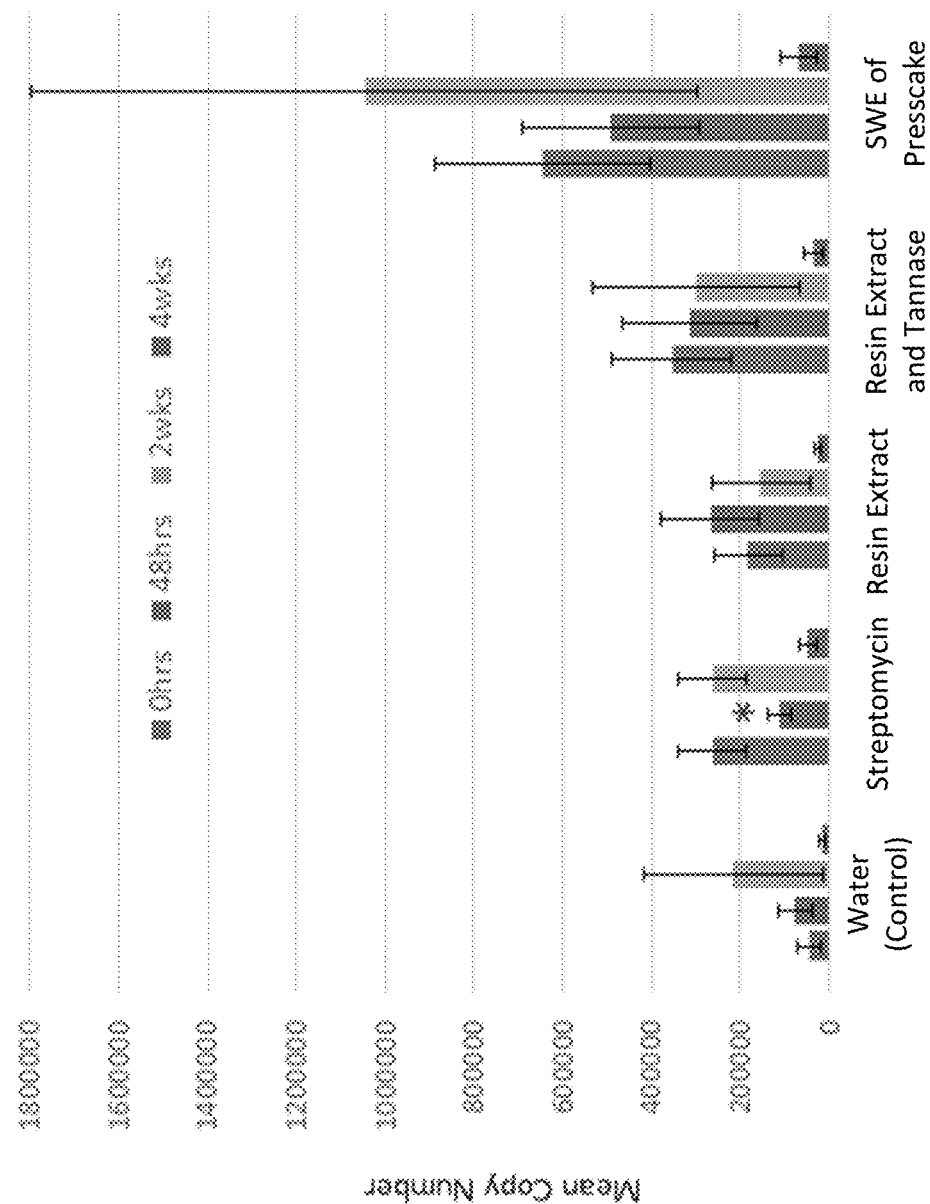

FIG. 5 shows a number of copies of CLas genes present in the leaf samples over time as determined by qPCR analysis of the leaf samples. All changes in the number of copies and CT titer were reported as changes from the initial value. Initially, the plants treated with cranberry compositions and Streptomycin had a high number of copies compared to the plants treated with water. However, after twenty-eight days, the plants treated with Streptomycin along with the plants treated with cranberry compositions showed significant reduction in the number of copies of CLas genes ($p<0.05$), indicating the effectiveness of treating HLB-infected leaves with cranberry compositions. In FIG. 5, the bars that represent a statistically significant difference in the reduction of the number of copies of CLas from the initial amount are indicated by a star.

There was an increase in the number of copies of CLas genes in the plants treated with SWE of Presscake Extract after fourteen days but a reduction in the number of copies after twenty-eight days. The plants treated with SWE of Presscake Extract started with a higher number of CLas bacteria (shown at 0 hrs in FIG. 5) relative to the other plants. One possible explanation for the increase in CLas before the decrease in CLas is that it was more difficult for SWE of Presscake Extract than other cranberry composition types to rapidly inhibit a high number of bacteria. Moreover, the proanthocyanidins (PACs) in SWE of Presscake Extract are larger in size than the PACs contained in Resin Extract and Resin Extract and Tannase. It is possible that SWE of Presscake Extract took longer to enter the phloem of the plant than the other extract types due to the larger size of the PACs.

Figure 6:
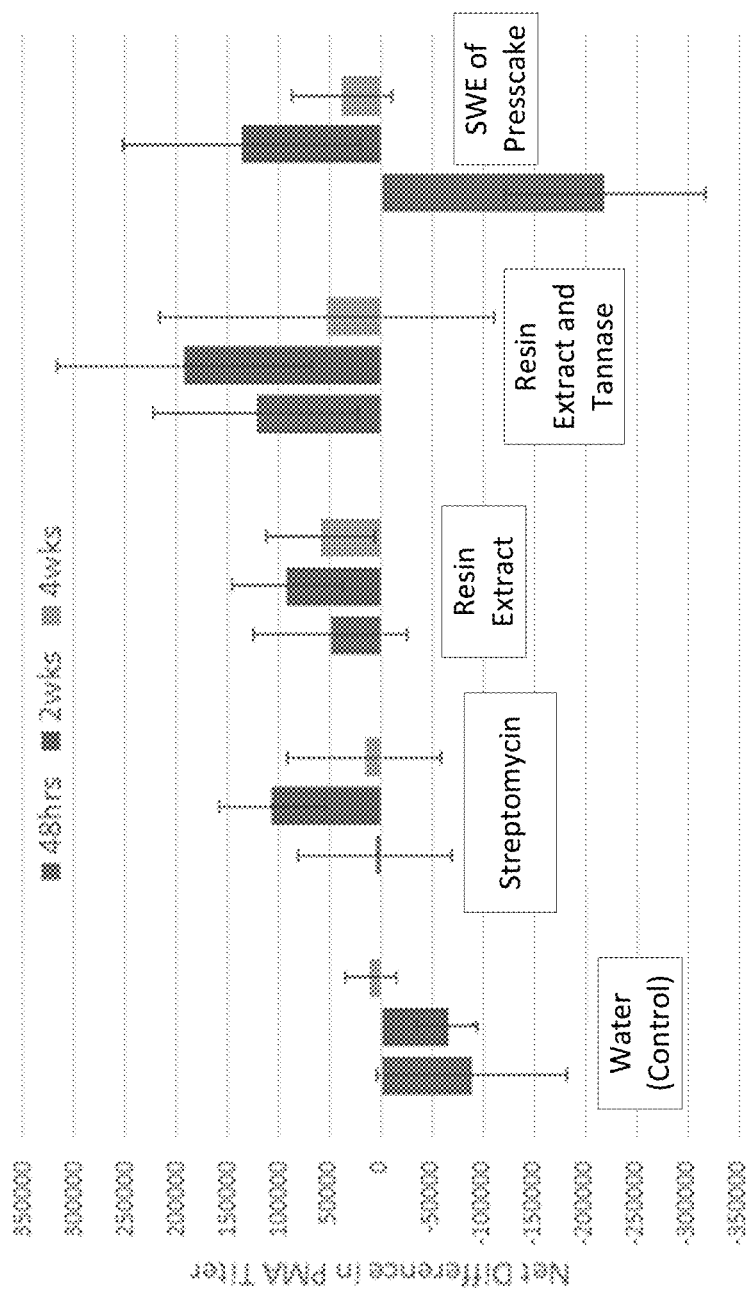

FIG. 6 shows a change in Propidium Monoazide (PMA) titer from 0 hr (pre-treatment) to two days, fourteen days, and twenty-eight days for each cranberry composition treatment. PMA titer provides an indication of the presence of live bacteria, here CLas. To quantify the live bacteria, the samples were treated with excess PMA. PMA selectively enters dead cells and, upon photo-activation, it intercalates and binds covalently to DNA strongly inhibiting its PCR amplification. Therefore, mainly the live DNA gets amplified. A positive value for the change in PMA titer indicates a reduction in live bacteria. The mostly negative values for the change in PMA titer for plants treated with water (the control) indicates an increase in live CLas bacteria in the treated plants. Plants treated with streptomycin, Resin Extract, and Resin Extract and Tannase showed response to treatment within forty-eight hours, indicated by the positive values for the change in PMA titer. The bacterial population in the plants treated with SWE of Presscake Extract increased initially after forty-eight hours, as shown by the negative change in PMA titer, and then started dying off after 2 weeks, as shown by the positive change in PMA titer. The PMA titer results are consistent with the qPCR results discussed with respect to FIG. 5.

Example 4: Phytotoxicity Spray Test

Figure 7B:
Figure 7A:

A small portion of a grapefruit tree was sprayed heavily with a 10% cranberry extract. FIG. 7A shows the sprayed leaves immediately after spraying and FIG. 7B shows the sprayed leaves forty-eight hours after spraying. The sprayed leaves showed no sign of phytotoxicity after forty-eight hours. The treated leaves were subsequently monitored for more than seven days. (not shown in the figures) for any sign of phytotoxicity and were found to show none.

Example 5: Phytotoxicity Dip Test

Figure 8B:
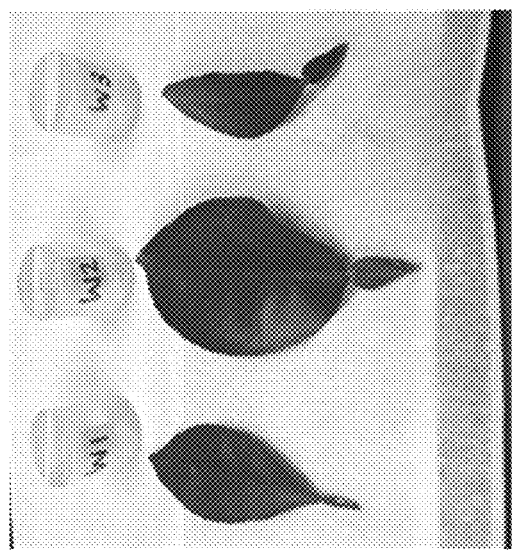
Figure 8A:
Figure 9B:
Figure 9A:
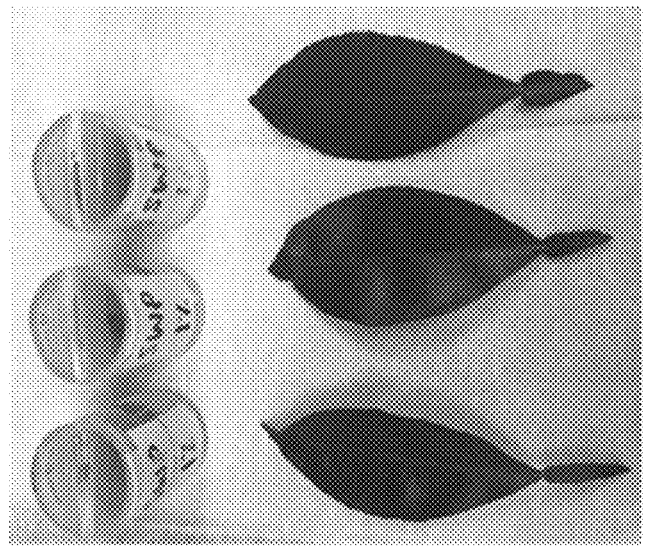

Citrus leaves were dipped in a solution with 1% solids content (1 Brix) of here SWE of Presscake Extract for a period of seven days. FIG. 9A shows the dipped leaves on Day 0 and FIG. 9B shows the dipped leaves on Day 7. The cranberry extract dipped citrus leaves showed no signs of phytotoxicity after seven days. Additional citrus leaves were dipped in a control buffer solution for the same period of seven days. FIGS. 8A and 8B show the control buffer dipped citrus leaves at Day 0 and Day 7, respectively. The control buffer dipped citrus leaves showed no signs of phytotoxicity after seven days.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating or inhibiting infection of a citrus plant by a bacterial plant pathogen, the method comprising:
providing a composition comprising phenolics at 3 mg/g to 100 mg/g, a cranberry solids content of about 1 to about 30 Brix, and quinic acid at 0.01% to 14%, wherein the composition is dissolvable in water; wherein the phenolics comprise:
anthocyanin at up to 100,000 mg/kg of the composition, and
proanthocyanidin at 2,500 mg/kg of the composition to 100,000 mg/kg of the composition; and
contacting a citrus plant infected with a bacterial plant pathogen with an amount of the composition effective to inhibit the bacterial plant pathogen.

2. The method of claim 1, wherein contacting the citrus plant comprises brushing or spraying onto the citrus plant, or injecting into the citrus plant, the composition.

3. The method of claim 1, wherein contacting the citrus plant comprises spraying, drenching, mixing, or injecting the composition into soil surrounding the citrus plant.

4. The method of claim 1, wherein the composition further comprises a carrier that enables delivery of the composition to a phloem of the citrus plant.

5. The method of claim 1, wherein the composition further comprises a starch degrading enzyme.

6. The method of claim 1, wherein the composition further comprises a tannase enzyme.

7. The method of claim 1, wherein the phenolics comprise anthocyanins at about 1 mg/kg of the composition to about 5000 mg/kg of the composition.

8. The method of claim 1, wherein the phenolics comprise the proanthocyanidins at about 25,000 mg/kg of the composition to about 75,000 mg/kg of the composition.

9. The method according to claim 1, wherein the bacterial plant pathogen is α-proteobacterium *Candidatus Liberibacter asiaticus*.

10. The method of claim 1, wherein the composition further comprises an adjuvant.

11. The method of claim 10, wherein the adjuvant is a surfactant.

12. The method of claim 10, wherein contacting the citrus plant having the bacterial plant pathogen infection with the amount of the composition effective to inhibit the bacterial plant pathogen comprises:
delivering the composition to a phloem of the citrus plant.

13. The method of claim 1, wherein the composition further comprises malic acid, or citric acid, or both.

14. The method of claim 1, wherein the composition is a cranberry composition.

15. The method of claim 14, wherein the cranberry composition is a cranberry extract.

16. A method of treating or inhibiting infection of a citrus plant by a bacterial plant pathogen, the method comprising:
providing a composition comprising phenolics at 3 mg/g to 100 mg/g, a cranberry solids content of about 1 to about 30 Brix, and at least one of quinic acid, malic acid, and citric acid, wherein the phenolics comprise benzoic acid at up to about 30 mg/g of the composition, wherein the composition is dissolvable in water; and
contacting a citrus plant infected with a bacterial plant pathogen with an amount of the composition effective to inhibit the bacterial plant pathogen.

17. The method according to claim 16, wherein the composition comprises quinic acid at about 0.01% to about 14%.

18. The method of claim 16, wherein the composition is a cranberry composition.

19. The method of claim 18, wherein the cranberry composition is a cranberry extract.

20. The method according to claim 16, wherein the bacterial plant pathogen is α-proteobacterium *Candidatus Liberibacter asiaticus*.

21. The method of claim 16, wherein the composition further comprises an adjuvant.

22. The method of claim 21, wherein the adjuvant is a surfactant.

23. The method of claim 21, wherein contacting the citrus plant having the bacterial plant pathogen infection with the amount of the composition effective to inhibit the bacterial plant pathogen comprises:
delivering the composition to a phloem of the citrus plant.

24. The method of claim 16, wherein contacting the citrus plant comprises brushing or spraying onto the plant, or injecting into the plant, the composition.

25. The method of claim 16, wherein contacting the citrus plant comprises spraying, drenching, mixing, or injecting the composition into soil surrounding the plant.

26. The method of claim 16, wherein the composition further comprises a carrier that enables delivery of the composition to a phloem of the citrus plant.

27. The method of claim 16, wherein the composition further comprises a starch degrading enzyme.

28. The method of claim 16, wherein the composition comprises the benzoic acid at up to about 1 mg/g.

29. The method of claim 16, wherein the composition comprises the benzoic acid at up to about 5 mg/g.

30. The method of claim 16, wherein the composition comprises the benzoic acid at up to about 10 mg/g.

31. The method of claim 16, wherein the phenolics comprise:
proanthocyanidin at 2,500 mg/kg of the composition to 100,000 mg/kg of the composition.

32. A method of treating or inhibiting infection of a citrus plant by a bacterial plant pathogen, the method comprising:

providing a composition comprising phenolics at 3 mg/g to 100 mg/g, wherein the phenolics comprise benzoic acid at up to about 30 mg/g of the composition, wherein the composition is dissolvable in water, wherein the composition comprises a cranberry solids content of about 1 to about 30 Brix; and contacting a citrus plant infected with a bacterial plant pathogen with an amount of the composition effective to inhibit the bacterial plant pathogen.

33. The method according to claim 32, wherein the bacterial plant pathogen is α-proteobacterium *Candidatus Liberibacter asiaticus*.

34. The method according to claim 32, wherein the composition further comprises a carrier that enables delivery of the composition to a phloem of the citrus plant.

35. The method according to claim 32, wherein the composition further comprises an adjuvant.

36. The method of claim 32, wherein the phenolics comprise proanthocyanidin at about 2,000 mg/kg to about 2,500 mg/kg.

37. The method of claim 32, wherein the phenolics comprise anthocyanins up to about 100,000 mg/kg.

38. The method of claim 32, wherein contacting the citrus plant having the bacterial plant pathogen infection with the amount of the composition effective to inhibit the bacterial plant pathogen comprises:

delivering the composition to a phloem of the citrus plant, a xylem of the citrus plant, or both.

* * * * *